United States Patent
Yue et al.

(10) Patent No.: US 12,430,895 B2
(45) Date of Patent: Sep. 30, 2025

(54) METHOD AND APPARATUS FOR UPDATING OBJECT RECOGNITION MODEL

(71) Applicant: HUAWEI TECHNOLOGIES CO., LTD., Guangdong (CN)

(72) Inventors: Jun Yue, Shenzhen (CN); Li Qian, Shenzhen (CN); Songcen Xu, Shenzhen (CN); Bin Shao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 17/951,271

(22) Filed: Sep. 23, 2022

(65) Prior Publication Data

US 2023/0020965 A1    Jan. 19, 2023

Related U.S. Application Data

(63) Continuation of application No. PCT/CN2021/082003, filed on Mar. 22, 2021.

(30) Foreign Application Priority Data

Mar. 24, 2020    (CN) .......................... 202010215064.9

(51) Int. Cl.
  *G06V 10/774*    (2022.01)
  *G06V 10/26*    (2022.01)
  (Continued)

(52) U.S. Cl.
  CPC .......... *G06V 10/7747* (2022.01); *G06V 10/26* (2022.01); *G06V 10/464* (2022.01);
  (Continued)

(58) Field of Classification Search
  CPC .. G06V 10/7747; G06V 10/26; G06V 10/464; G06V 10/761; G06V 10/764;
  (Continued)

(56) References Cited

U.S. PATENT DOCUMENTS

| 8,463,608 B2 | 6/2013 | Dow et al. |
| 10,381,022 B1 | 8/2019 | Chaudhuri et al. |

(Continued)

FOREIGN PATENT DOCUMENTS

| CN | 101943982 A | 1/2011 |
| CN | 107223246 A * | 9/2017 | ............. G06F 16/50 |

(Continued)

OTHER PUBLICATIONS

Holzapfel H et al: "A dialogue approach to learning object descriptions and semantic categories", Robotics and Autonomous Systems, Elsevier BV, Amsterdam, NL, vol. 56, No. 11, Nov. 30, 2008, XP025561295, 10 pages.

(Continued)

*Primary Examiner* — Jose L Couso

(57) ABSTRACT

A method and apparatus for updating an object recognition model in the field of artificial intelligence are disclosed. According to the method, a target image and first voice information of a user are obtained. The first voice information indicates a first category of a target object in the target image. A feature library of a first object recognition model is updated based on the target image and the first voice information. The updated first object recognition model includes a feature of the target object and a first label indicating the first category, and the feature of the target object corresponds to the first label. A recognition rate of an object recognition model can be improved more easily according to the technical solution provided in this application.

16 Claims, 12 Drawing Sheets

(51) Int. Cl.
*G06V 10/46* (2022.01)
*G06V 10/74* (2022.01)
*G06V 10/764* (2022.01)
*G06V 10/80* (2022.01)

(52) U.S. Cl.
CPC .......... *G06V 10/761* (2022.01); *G06V 10/764* (2022.01); *G06V 10/809* (2022.01)

(58) Field of Classification Search
CPC .... G06V 10/809; G06V 40/71; G06V 10/811; G06V 10/454; G06V 10/54; G06V 10/774; G06V 10/82; G06V 20/41; G06V 30/18057; G06V 20/698; G06V 30/19173; G06N 3/063; G06N 20/00; G06N 3/045; G06N 3/09; G06N 3/084; G06N 3/0464; G06N 3/048; G06N 3/02; G06N 3/08–088; G06N 3/0445; G06N 3/0454; G06N 3/4046; G06N 7/00; G06N 7/01; G06F 18/241; G06F 18/23213; G06F 18/22; G06F 18/24; G06F 18/2413; G06F 18/256; G06F 16/434; G06F 3/011; G06F 18/214; G06F 18/2411; G06F 18/2415; G06T 2207/10016; G06T 2207/30201; G06T 2207/30232; G06T 3/4046; G06T 5/60; G06T 9/002; G06T 2207/20076; G06T 2207/20081; G06T 2207/20084; G02B 2027/0138; G02B 2027/014; G10L 15/063; G10L 15/24; G10L 15/25; G10L 15/28; G10L 15/30; G10L 25/57; G06K 7/1482; Y10S 128/925

See application file for complete search history.

(56) References Cited

U.S. PATENT DOCUMENTS

| | | | |
|---|---|---|---|
| 10,410,627 | B2 | 9/2019 | Cohen et al. |
| 11,017,317 | B2* | 5/2021 | Rajkumar ............. G06N 3/045 |
| 2014/0289323 | A1* | 9/2014 | Kutaragi ................ H04L 51/08 |
| | | | 709/206 |
| 2018/0286397 | A1* | 10/2018 | Nakano ................... G10L 15/02 |
| 2020/0042796 | A1* | 2/2020 | Kim ..................... G06V 10/764 |
| 2020/0175384 | A1* | 6/2020 | Zhang ................... G06N 3/088 |

FOREIGN PATENT DOCUMENTS

| | | |
|---|---|---|
| CN | 107808149 A | 3/2018 |
| CN | 108288208 A | 7/2018 |
| CN | 109800805 A | 5/2019 |
| CN | 109978881 A | 7/2019 |
| CN | 110070107 B | 12/2020 |

OTHER PUBLICATIONS

Extended European Search Report issued in EP21775238.5, dated Jun. 19, 2023, 9 pages.
International Search Report and Written Opinion issued in PCT/CN2021/082003, dated Jun. 25, 2021, 9 pages.
Office Action issued in CN202010215064.9, dated Nov. 30, 2024, 9 pages.

* cited by examiner

S910: Determine, based on a similarity between a first label and each of at least one category of label, that the first label is a first category of label in the at least one category of label, where the first label indicates a first category of a target object

S920: Infer a category of the target object by using a second object recognition model, to obtain a first probability that a category label of the target object is the first category of label

S930: Determine, based on the first probability, that the first category is a target confidence of an actual category of the target object

S940: When the target confidence is greater than or equal to a confidence threshold, add a feature of the target object and the first label to a first object recognition model

FIG. 9

METHOD AND APPARATUS FOR UPDATING OBJECT RECOGNITION MODEL

CROSS-REFERENCE TO RELATED APPLICATIONS

This application continuation of International Application No. PCT/CN2021/082003, filed on Mar. 22, 2021, which claims priority to Chinese Patent Application No. 202010215064.9, filed on Mar. 24, 2020. The disclosures of the aforementioned applications are hereby incorporated by reference in their entireties.

TECHNICAL FIELD

This application relates to the field of artificial intelligence (AI), and in particular, to a method and apparatus for updating an object recognition model.

BACKGROUND

Artificial intelligence is a theory, a method, a technology, or an application system that simulates, extends, and expands human intelligence by using a digital computer or a machine controlled by a digital computer, to perceive an environment, obtain knowledge, and achieve an optimal result based on the knowledge. In other words, artificial intelligence is a branch of computer science, and is intended to understand the essence of intelligence and produce a new intelligent machine that can react in a manner similar to human intelligence. The artificial intelligence is to study design principles and implementation methods of various intelligent machines, so that the machines have perceiving, inference, and decision-making functions. Research in the artificial intelligence field include robotics, natural language processing, computer vision, decision-making and inference, human-computer interaction, recommendation and search, an AI basic theory, and the like.

Object detection is one of classical issues in the computer vision. A task of the object detection is to mark a location of an object in an image by using a frame and indicate a category of the object. In object detection, the indicated category of the object is obtained through object recognition. Object recognition may also be understood as object classification, and is a method for distinguishing different categories of objects based on features of the objects.

With development of artificial intelligence technologies, object recognition is no longer implemented only by conventional manual recognition, and may be implemented by using a deep learning-based object recognition model.

The deep learning-based object recognition model is usually trained by using a large quantity of object images of known categories, so that the object recognition model can learn unique features of different categories of objects, and record correspondences between the features of different categories of objects and category labels. Therefore, when an object image is input into the trained object recognition model during actual service application, a category of an object can be inferred based on the object image, to perform object recognition.

For example, when performing object detection by using a terminal device such as a mobile phone, a user may recognize, by using a trained object recognition model, a category of an object in an image photographed by the terminal such as the mobile phone.

The method of training the object recognition model to recognize a category of an object has the following problem: The object recognition model can recognize only a category of an object appearing during training. If a category of a target object does not belong to categories of objects appearing during training, the object recognition model cannot recognize the target object.

To resolve the problem, after the object recognition model is trained, the object recognition model may be updated during usage, to recognize more categories of objects.

Therefore, how to update the object recognition model is an urgent technical problem to be resolved.

SUMMARY

This application provides a method and apparatus for updating an object recognition model, so that the object recognition model can recognize more objects. This improves a recognition rate of the object recognition model.

According to a first aspect, this application provides a method for updating an object recognition model. The method includes: obtaining a target image captured by a photographing device; obtaining first voice information captured by a voice device, where the first voice information indicates a first category of a target object in the target image; and updating a first object recognition model based on the target image and the first voice information, where the updated first object recognition model includes a feature of the target object and a first label, there is a correspondence between the feature of the target object and the first label, and the first label indicates the first category.

In the method in this application, a feature of an object and a category label corresponding to the feature may be added to the object recognition model, so that the object recognition model can recognize a category of object. This improves a recognition rate of the object recognition model, and further improves intelligence of the object recognition model. In addition, according to the method in this application, a user can indicate a to-be-updated category of an object by using voice. Therefore, the user can update the object recognition model more easily.

With reference to the first aspect, in a first possible implementation, the updating a first object recognition model based on the target image and the first voice information includes: determining, based on a similarity between the first label and each of at least one category of label, that the first label is a first category of label in the at least one category of label, where a similarity between the first label and the first category of label is greater than a similarity between the first label and another category of label in the at least one category of label; determining, based on the target image by using a second object recognition model, a first probability that a category label of the target object is the first category of label; and when the first probability is greater than or equal to a preset probability threshold, adding the feature of the target object and the first label to a feature library of the first object recognition model.

In this implementation, the first object recognition model is updated only when it is determined that there is a high probability that the category indicated by the user by using the voice is an actual category of the target object. This helps improve accuracy of updating, to the first object recognition model, the category label corresponding to the feature of the object, and further improve recognition accuracy of the first object recognition model.

With reference to the first possible implementation, in a second possible implementation, the determining, based on a similarity between the first label and each of at least one category of label, that the first label is a first category of label in the at least one category of label includes: determining, based on a similarity between a semantic feature of the first label and a semantic feature of each of at least one category of label, that the first label is the first category of label of the at least one category of label; and that a similarity between the first label and the first category of label is greater than a similarity between the first label and another category of label of the at least one category of label includes: a distance between the semantic feature of the first label and a semantic feature of the first category of label is less than a distance between the semantic feature of the first label and a semantic feature of the another category of label.

With reference to the first aspect or any one of the possible implementations, in a third possible implementation, the target image includes a first object, the target object is an object, in the target image, that is located in a direction indicated by the first object and that is closest to the first object, and the first object includes an eyeball or a finger.

In this implementation, an eyeball or a finger in the target image may be specified in advance as an object indicating the target object, and an object in a direction indicated by the object indicating the target object is determined as the target object. This helps accurately mark, by using the first category indicated by the voice, the target object specified by the user, and further improve recognition accuracy of the updated first object recognition model.

With reference to the third possible implementation, in a fourth possible implementation, the updating a first object recognition model based on the target image and the first voice information includes: determining a bounding box of the first object in the target image based on the target image; determining, based on an image in the bounding box, the direction indicated by the first object; performing visual saliency detection on the target image, to obtain a plurality of salient regions in the target image; determining a target salient region from the plurality of salient regions based on the direction indicated by the first object, where the target salient region is a salient region, in the plurality of salient regions, that is in the direction indicated by the first object and that is closest to the bounding box of the first object; and updating the first object recognition model based on the target salient region, where an object in the target salient region includes the target object.

With reference to the fourth possible implementation, in a fifth possible implementation, the determining, based on an image in the bounding box, the direction indicated by the first object includes: classifying the image in the bounding box by using a classification model, to obtain a target category of the first object; and determining, based on the target category of the first object, the direction indicated by the first object.

According to a second aspect, this application provides an apparatus for updating an object recognition model. The apparatus includes an obtaining module, configured to: obtain a target image captured by a photographing device; and obtain first voice information captured by a voice device, where the first voice information indicates a first category of a target object in the target image; and an updating module, configured to update a first object recognition model based on the target image and the first voice information, where the updated first object recognition model includes a feature of the target object and a first label, there is a correspondence between the feature of the target object and the first label, and the first label indicates the first category.

In the apparatus in this application, a feature of an object and a category label corresponding to the feature may be added to the object recognition model, so that the object recognition model can recognize a category of object. This improves a recognition rate of the object recognition model, and further improves intelligence of the object recognition model. In addition, by using the apparatus in this application, a user can indicate a to-be-updated category of an object by using voice. Therefore, the user can update the object recognition model more easily.

With reference to the second aspect, in a first possible implementation, the updating module is specifically configured to: determine, based on a similarity between the first label and each of at least one category of label, that the first label is a first category of label in the at least one category of label, where a similarity between the first label and the first category of label is greater than a similarity between the first label and another category of label in the at least one category of label; determine, based on the target image by using a second object recognition model, a first probability that a category label of the target object is the first category of label; and when the first probability is greater than or equal to a preset probability threshold, add the feature of the target object and the first label to the first object recognition model.

In this implementation, the first object recognition model is updated only when it is determined that there is a high probability that the category indicated by the user is an actual category of the target object. This helps improve accuracy of updating, to the first object recognition model, the category label corresponding to the feature of the object, and further improve recognition accuracy of the first object recognition model.

With reference to the first possible implementation, in a second possible implementation, the updating module is specifically configured to determine, based on a similarity between a semantic feature of the first label and a semantic feature of each of at least one category of label, that the first label is the first category of label of the at least one category of label. That a similarity between the first label and the first category of label is greater than a similarity between the first label and another category of label of the at least one category of label includes: a distance between the semantic feature of the first label and a semantic feature of the first category of label is less than a distance between the semantic feature of the first label and a semantic feature of the another category of label.

With reference to the second aspect or any one of the possible implementations, in a third possible implementation, the target image includes a first object, the target object is an object, in the target image, that is located in a direction indicated by the first object and that is closest to the first object, and the first object includes an eyeball or a finger.

In this implementation, an eyeball or a finger in the target image may be specified in advance as an object indicating the target object, and an object in a direction indicated by the object indicating the target object is determined as the target object. This helps accurately mark, by using the first category indicated by the voice, the target object specified by the user, and further improve recognition accuracy of the updated first object recognition model.

With reference to the third possible implementation, in a fourth possible implementation, the updating module is specifically configured to: determine a bounding box of the first object in the target image based on the target image; determine, based on an image in the bounding box, the direction indicated by the first object; perform visual saliency detection on the target image, to obtain a plurality of salient regions in the target image; determine a target salient region from the plurality of salient regions based on the direction indicated by the first object, where the target salient region is a salient region, in the plurality of salient regions, that is in the direction indicated by the first object and that is closest to the bounding box of the first object; and update the first object recognition model based on the target salient region, where an object in the target salient region includes the target object.

With reference to the fourth possible implementation, in a fifth possible implementation, the updating module is specifically configured to: classify the image in the bounding box by using a classification model, to obtain a target category of the first object; and determine, based on the target category of the first object, the direction indicated by the first object.

According to a third aspect, this application provides a method for updating an object recognition model. The method includes: obtaining a target image captured by a photographing device; obtaining a first indication information, where the first indication information indicates a first category of a target object in the target image; and when the first category is a target confidence of an actual category of the target object, and the target confidence is greater than or equal to a preset confidence threshold, updating a first object recognition model based on the target image and the first indication information, where a feature library of the updated first object recognition model includes a feature of the target object and a first label, there is a correspondence between the feature of the target object and the first label, and the first label indicates the first category. The target confidence is determined based on a first probability, and the first probability is a probability, obtained by a second object recognition model through recognizing the target object, that the first label is a first category of label. The second object recognition model is configured to recognize an image, to obtain a probability that a category label of an object in the image is each of at least one category of label. The at least one category of label is obtained through clustering category labels corresponding to features in the feature library of the first object recognition model, the at least one category of label includes the first category of label, and a similarity between the first label and the first category of label is greater than a similarity between the first label and another category of label in the at least one category of label.

In the method, the first object recognition model is updated only when a confidence that the first label is an actual label of the target object is high. The confidence is determined based on a probability, obtained by the second object recognition model through inference based on the target image, that a category label of a to-be-detected object is a category of label to which the first label belongs. This helps improve accuracy of updating, to the first object recognition model, the category label corresponding to the feature of the object, and further improve recognition accuracy of the first object recognition model.

With reference to the third aspect, in a first possible implementation, the updating a first object recognition model based on the target image and the first indication information includes: determining, based on a similarity between the first label and each of the at least one category of label, that the first label is the first category of label; inputting the target image to the second object recognition model, to obtain the first probability; determining the target confidence based on the first probability; and when the target confidence is greater than or equal to the confidence threshold, adding the feature of the target object and the first label to the first object recognition model.

With reference to the third aspect or the first possible implementation, in a second possible implementation, that a similarity between the first label and the first category of label is greater than a similarity between the first label and another category of label of the at least one category of label includes: a distance between the semantic feature of the first label and a semantic feature of the first category of label is less than a distance between the semantic feature of the first label and a semantic feature of the another category of label.

With reference to the second possible implementation, in a third possible implementation, the confidence is the first probability.

With reference to the third aspect or any one of the possible implementations, in a fourth possible implementation, the first indication information includes voice information captured by a voice device or text information captured by a touch apparatus.

According to a fourth aspect, this application provides an apparatus for updating an object recognition model. The apparatus includes a corresponding module configured to implement the method in the third aspect or any one of the possible implementations.

According to a fifth aspect, this application provides an apparatus for updating an object recognition model. The apparatus includes: a memory, configured to store instructions; and a processor, configured to execute the instructions stored in the memory. When executing the instructions stored in the memory, the processor is configured to perform the method in the first aspect or any one of the possible implementations of the first aspect.

According to a sixth aspect, this application provides an apparatus for updating an object recognition model. The apparatus includes: a memory, configured to store instructions; and a processor, configured to execute the instructions stored in the memory. When executing the instructions stored in the memory, the processor is configured to perform the method in the third aspect or any one of the possible implementations of the third aspect.

According to a seventh aspect, this application provides a computer-readable medium. The computer-readable medium stores instructions executed by a device, and the instructions are used to implement the method in the first aspect or any one of the possible implementations of the first aspect.

According to an eighth aspect, this application provides a computer-readable medium. The computer-readable medium stores instructions executed by a device, and the instructions are used to implement the method in the third aspect or any one of the possible implementations of the third aspect.

According to a ninth aspect, this application provides a computer program product including instructions. When the computer program product is run on a computer, the computer is enabled to perform the method in the first aspect or any one of the possible implementations of the first aspect.

According to a tenth aspect, this application provides a computer program product including instructions. When the computer program product is run on a computer, the computer is enabled to perform the method in the third aspect or any one of the possible implementations of the third aspect.

According to an eleventh aspect, this application provides a chip. The chip includes a processor and a data interface, and the processor reads, through the data interface, instructions stored in a memory, to perform the method in the first aspect or any one of the possible implementations of the first aspect.

Optionally, as an implementation, the chip may further include the memory. The memory stores the instructions, and the processor is configured to execute the instructions stored in the memory. When executing the instructions, the processor is configured to perform the method in the first aspect or any one of the possible implementations of the first aspect.

According to a twelfth aspect, this application provides a chip. The chip includes a processor and a data interface, and the processor reads, through the data interface, instructions stored in a memory, to perform the method in the third aspect or any one of the possible implementations of the third aspect.

Optionally, as an implementation, the chip may further include the memory. The memory stores the instructions, and the processor is configured to execute the instructions stored in the memory. When executing the instructions, the processor is configured to perform the method in the third aspect or any one of the possible implementations of the third aspect.

According to a thirteenth aspect, this application provides a computing device. The computing device includes a processor and a memory. The memory stores computer instructions, and the processor executes the computer instructions, to implement the method in the first aspect or any one of the possible implementations of the first aspect.

According to a fourteenth aspect, this application provides a computing device. The computing device includes a processor and a memory. The memory stores computer instructions, and the processor executes the computer instructions, to implement the method in the third aspect or any one of the possible implementations of the third aspect.

According to a fifteenth aspect, this application provides an object recognition method. The method includes: obtaining a to-be-recognized image captured by a photographing device; and performing category recognition on the to-be-recognized image by using a first object recognition model, where the first object recognition model is obtained through adding a feature of a target object and a first label based on a target image captured by the photographing device and first voice information captured by a voice device, there is a correspondence between the feature of the target object and the first label, the first voice information indicates a first category of the target object in the target image, and the first label indicates the first category.

In some possible implementations, when a first probability is greater than or equal to a preset probability threshold, the feature of the target object and the first label are added to the first object recognition model. The first probability is obtained based on the target image by using a second object recognition model, and the first probability is a probability that a category label of the target object is a first category of label. The first category of label is determined based on the first label and at least one category of label, and a similarity between the first label and the first category of label is greater than a similarity between the first label and another category of label in the at least one category of label.

In some possible implementations, that a similarity between the first label and the first category of label is greater than a similarity between the first label and another category of label of the at least one category of label includes: a distance between the semantic feature of the first label and a semantic feature of the first category of label is less than a distance between the semantic feature of the first label and a semantic feature of the another category of label.

In some possible implementations, the target image includes a first object, the target object is an object, in the target image, that is located in a direction indicated by the first object and that is closest to the first object, and the first object includes an eyeball or a finger.

According to a sixteenth aspect, this application provides an object recognition apparatus. The apparatus includes a corresponding module configured to implement the method in the fifteenth aspect or any one of the possible implementations.

According to a seventeenth aspect, this application provides an object recognition apparatus. The apparatus includes: a memory, configured to store instructions; and a processor, configured to execute the instructions stored in the memory. When executing the instructions stored in the memory, the processor is configured to perform the method in the fifteenth aspect or any one of the possible implementations of the fifteenth aspect.

According to an eighteenth aspect, this application provides a computer-readable medium. The computer-readable medium stores instructions executed by a device, and the instructions are used to implement the method in the fifteenth aspect or any one of the possible implementations of the fifteenth aspect.

According to a nineteenth aspect, this application provides a computer program product including instructions. When the computer program product is run on a computer, the computer is enabled to perform the method in the fifteenth aspect or any one of the possible implementations of the fifteenth aspect.

According to a twentieth aspect, this application provides a chip. The chip includes a processor and a data interface, and the processor reads, through the data interface, instructions stored in a memory, to perform the method in the fifteenth aspect or any one of the possible implementations of the fifteenth aspect.

Optionally, as an implementation, the chip may further include the memory. The memory stores the instructions, and the processor is configured to execute the instructions stored in the memory. When executing the instructions, the processor is configured to perform the method in the fifteenth aspect or any one of the possible implementations of the fifteenth aspect.

According to a twenty-first aspect, this application provides a computing device. The computing device includes a processor and a memory. The memory stores computer instructions, and the processor executes the computer instructions, to implement the method in the fifteenth aspect or any one of the possible implementations of the fifteenth aspect.

BRIEF DESCRIPTION OF DRAWINGS

FIG. 9 is a schematic flowchart of a method for updating an object recognition model according to another embodiment of this application;

DESCRIPTION OF EMBODIMENTS

Figure 1:
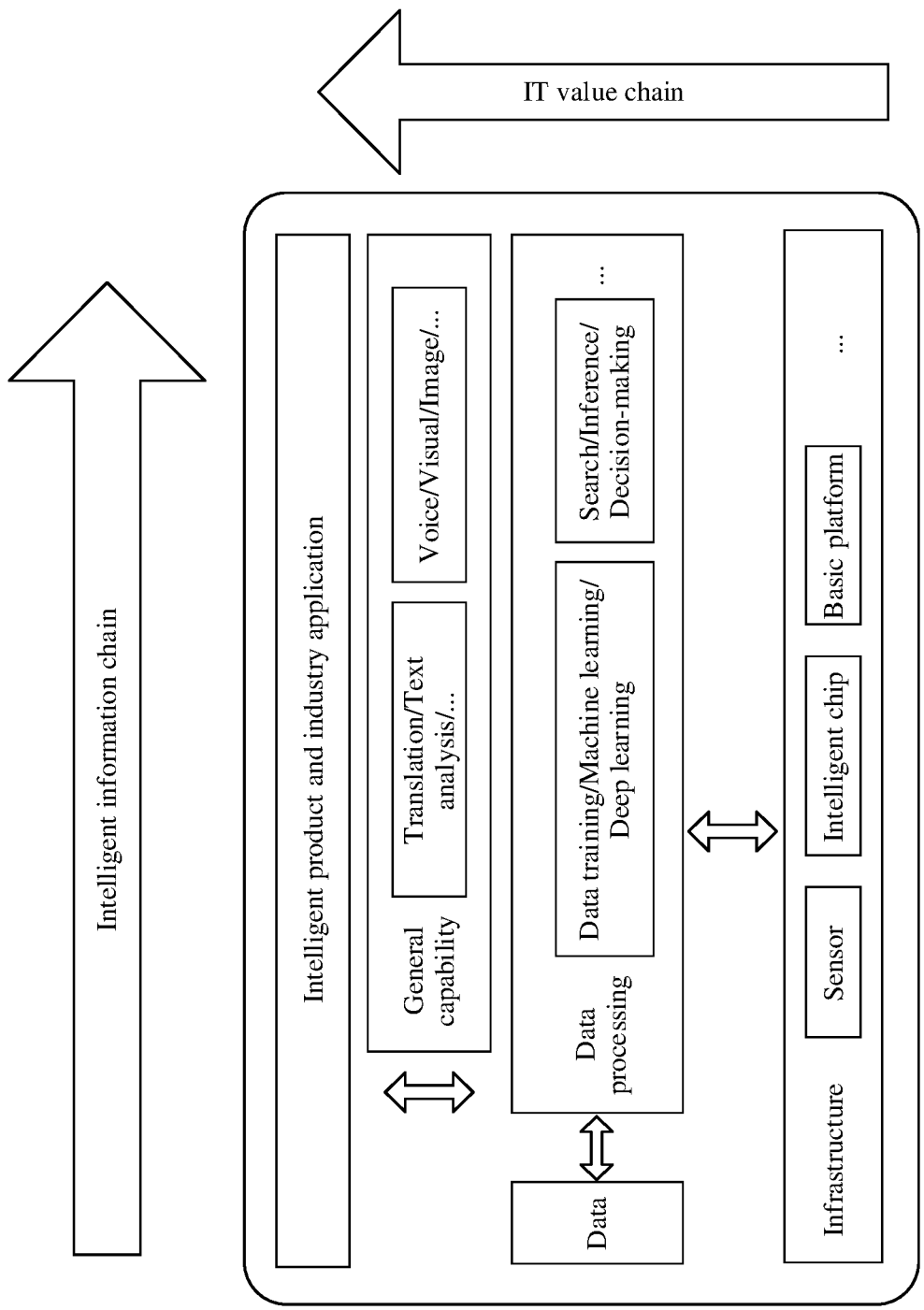
FIG. 1 is a schematic diagram of an artificial intelligence main framework according to this application.

FIG. 1 is a schematic diagram of an artificial intelligence main framework. The main framework describes an overall working procedure of an artificial intelligence system, and is applicable to a requirement of a general artificial intelligence field.

The following describes the foregoing artificial intelligence main framework from two dimensions: an "intelligent information chain" (horizontal axis) and an "IT value chain" (vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In these processes, the data undergoes a refinement process of "data-information-knowledge-intelligence".

The "IT value chain" reflects a value brought by artificial intelligence to the information technology industry from an underlying infrastructure and information (technology providing and processing implementation) of human intelligence to an industrial ecological process of a system.

(1) Infrastructure

The infrastructure provides calculation capability support for the artificial intelligence system, communicates with an external world, and implements supporting by using a basic platform. The infrastructure communicates with the outside by using a sensor. A computing capability is provided by an intelligent chip (a hardware acceleration chip such as a CPU, an NPU, a GPU, an ASIC, or an FPGA). The basic platform of the infrastructure includes related platforms, for example, a distributed computing framework and a network, for assurance and support, including cloud storage and computing, an interconnection network, and the like. For example, the sensor communicates with the outside to obtain data, and the data is provided to a smart chip in a distributed computing system provided by the basic platform for computing.

(2) Data

Data at an upper layer of the infrastructure is used to indicate a data source in the field of artificial intelligence. The data relates to a graph, an image, voice, and text, further relates to Internet of things data of a conventional device, and includes service data of an existing system and perception data such as force, displacement, a liquid level, a temperature, and humidity.

(3) Data Processing

Data processing usually includes a manner such as data training, machine learning, deep learning, searching, inference, or decision-making.

Machine learning and deep learning may mean performing symbolic and formalized intelligent information modeling, extraction, preprocessing, training, and the like on data.

Inference is a process in which a human intelligent inferring manner is simulated in a computer or an intelligent system, and machine thinking and problem resolving are performed by using formal information according to an inferring control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may be further formed based on a data processing result, for example, an algorithm or a general system, such as translation, text analysis, computer vision processing, speech recognition, and image recognition.

(5) Intelligent Product and Industry Application

The intelligent product and the industry application are a product and an application of the artificial intelligence system in various fields, and are package of an overall solution of the artificial intelligence, so that decision-making for intelligent information is productized and an application is implemented. Application fields mainly include smart manufacturing, smart transportation, smart home, smart health care, smart security protection, autonomous driving, a safe city, a smart terminal, and the like.

For example, a large quantity of images including objects may be obtained as data. Then, data processing is performed on the data, that is, deep learning is performed on an association relationship between a category and a feature of an object in the image. After data processing is performed, an object recognition model with a general capability may be obtained. The object recognition model is deployed on an infrastructure, for example, deployed on a device such as a robot, to obtain an intelligent product with an object recognition function. After capturing an image, the intelligent product may recognize the image by using the object recognition model deployed on the intelligent product, to obtain the category of the object in the image. This can implement an industry application of object recognition.

Object recognition in this application may also be referred to as image recognition, and is a technology in which a computer processes, analyzes, and understands an image, to recognize various categories of targets in the image. A model used to implement object recognition is referred to as an object recognition model, or may be referred to as an image recognition model.

Figure 2:
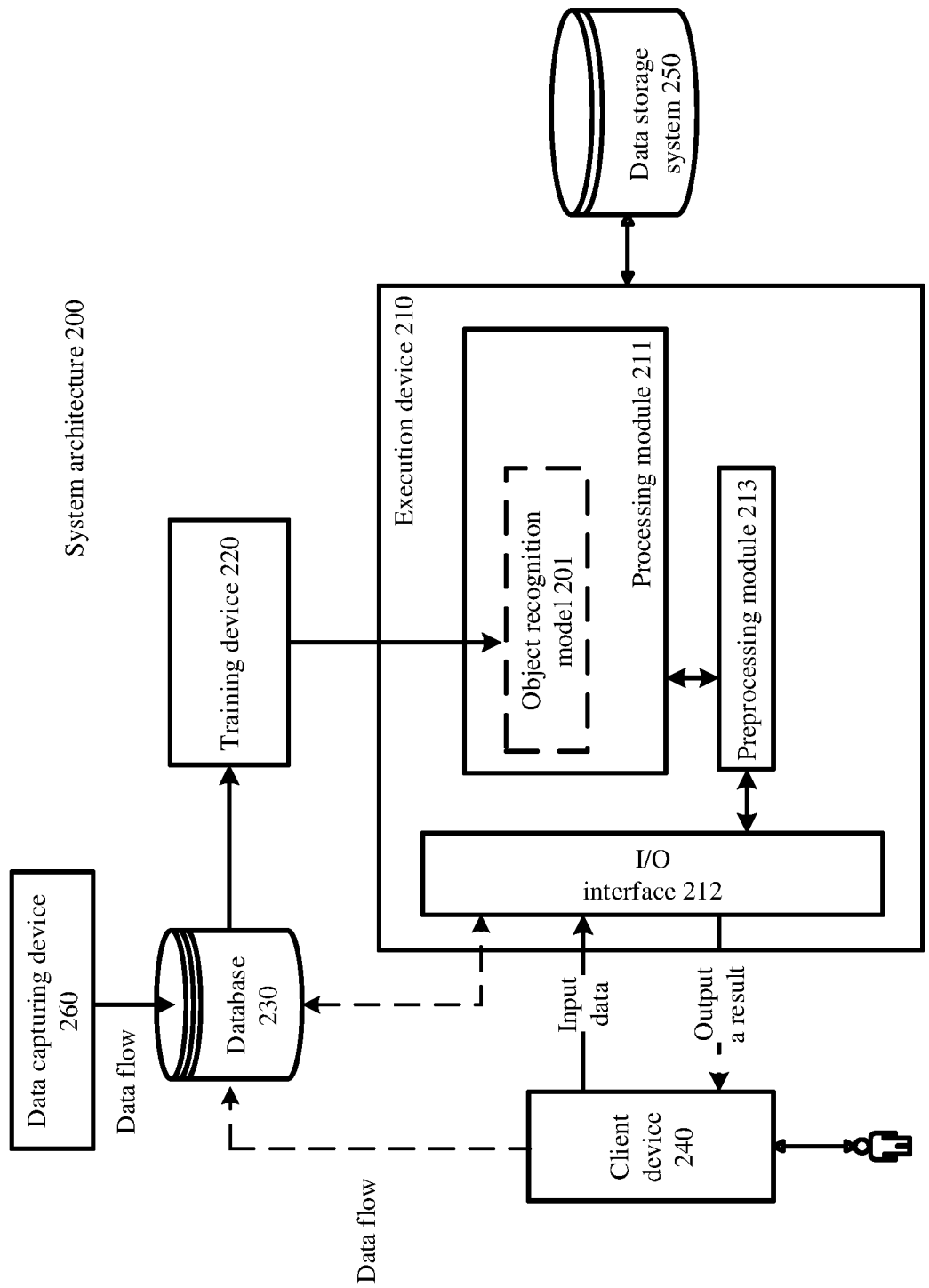
FIG. 2 is a schematic diagram of a structure of a system architecture according to an embodiment of this application.

The object recognition model may be obtained through training. With reference to FIG. 2, the following describes an example of a method for training an object recognition model.

In FIG. 2, a data capturing device 260 is configured to capture training data. For example, the training data may include a training image and a category corresponding to the training image, and a result of the training image may be a result of manual pre-labeling.

After capturing the training data, the data capturing device 260 stores the training data in a database 230, and a training device 220 obtains an object recognition model 201 through training based on the training data maintained in the database 230.

The following describes the object recognition model 201 obtained by the training device 220 based on the training data. The training device 220 processes an input original image, and compares a category of an output image with a labeled category of the original image until a difference between the category of the image output by the training device 220 and the labeled category of the original image is less than a specific threshold. In this way, training of the object recognition model 201 is completed.

The object recognition model 201 can be used for object recognition. The object recognition model 201 in this embodiment may specifically be a neural network. It should be noted that, during actual application, the training data maintained in the database 230 is not necessarily all captured by the data capturing device 260, and may be received from another device. It should further be noted that the training device 220 may not necessarily train the object recognition model 201 completely based on the training data maintained in the database 230, or may obtain training data from a cloud or another place to perform model training. The foregoing descriptions should not be construed as a limitation on embodiments of this application.

The object recognition model 201 obtained through training by the training device 220 may be applied to different systems or devices, for example, an execution device 210 shown in FIG. 2. The execution device 210 may be a terminal, for example, a mobile phone terminal, a tablet computer, a laptop computer, augmented reality (AR)/virtual reality (VR), or a vehicle-mounted terminal, or may be a server, a cloud, or the like. In FIG. 2, the execution device 210 configures an input/output (I/O) interface 212, configured to exchange data with an external device. A user may input data to the I/O interface 212 by using a client device 240, where the input data in this embodiment may include a to-be-recognized image input by the client device.

A preprocessing module 213 is configured to perform preprocessing based on the input data (for example, the to-be-processed image) received by the I/O interface 212. In this embodiment, the preprocessing module 213 may not exist.

In a process in which the execution device 210 preprocesses the input data, or in a process in which a processing module 211 of the execution device 210 performs computing, the execution device 210 may invoke data, code, and the like in a data storage system 250 for corresponding processing, and may further store, in the data storage system 250, data, an instruction, and the like that are obtained through the corresponding processing.

Finally, the I/O interface 212 returns a processing result, for example, the obtained category of the image, to the client device 240, to provide the category to the user.

In a case shown in FIG. 2, the user may manually input data and the user may input the data on an interface provided by the I/O interface 212. In another case, the client device 240 may automatically send a to-be-recognized image to the I/O interface 212. If it is required that the client device 240 needs to obtain authorization from the user to automatically send the to-be-recognized image, the user may set corresponding permission on the client device 240. The user may check, on the client device 240, a result of category recognition output by the execution device 210. Specifically, the result may be presented in a form of display, sound, an action, or the like. The client device 240 may alternatively be used as a data capturing end, to capture, as new sample data, the to-be-recognized image input to the I/O interface 212 and the result of category recognition output from the I/O interface 212, and store the new sample data in the database 230. It is clear that the client device 240 may alternatively not perform capturing. Instead, the I/O interface 212 directly stores, in the database 230 as new sample data, the input data input to the I/O interface 212 and the output result output from the I/O interface 212.

It should be noted that FIG. 2 is merely a schematic diagram of training an object recognition model according to an embodiment of this application. A location relationship between a device, a component, a module, and the like shown in FIG. 2 constitutes no limitation. For example, in FIG. 2, the data storage system 250 is an external memory relative to the execution device 210. In another case, the data storage system 250 may alternatively be disposed in the execution device 210.

The object recognition model may be implemented by using a neural network, may further be implemented by using a deep neural network, and may further be implemented by using a convolutional neural network.

To better understand the solutions provided in embodiments of this application, the following first describes terms and concepts related to the neural network in embodiments of this application.

(1) Neural Network

The neural network (NN) is a complex network system including a large quantity of simple processing units (which are also referred to as neurons) that are widely connected to each other. The neural network reflects a plurality of basic features of a human brain function, and is a highly complex non-linear dynamic learning system.

The neural network may include a neuron. The neuron may be an operation unit that uses xs and an intercept of 1 as an input. An output of the operation unit may be shown as a formula (1-1):

$$h_{W,b}(x) = f(W^T x) = f(\Sigma_{s=1}^{n} W_s x_s + b) \quad (1\text{-}1), \text{where}$$

S=1, 2, ..., or n, n is a natural number greater than 1, $W_s$ is a weight of $x_s$, b is a bias of the neuron, and f is an activation function of the neuron, used to introduce a non-linear feature into the neural network, to convert an input signal in the neuron into an output signal. The output signal of the activation function may be used as an input of a next convolutional layer, and the activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network with a plurality of hidden layers. The DNN is divided based on locations of different layers, and a neural network in the DNN may be divided into three types: an input layer, a hidden layer, and an output layer. Usually, a first layer is the input layer, a last layer is the output layer, and a middle layer is the hidden layer. Layers are fully connected. To be specific, any neuron at an $i^{th}$ layer is necessarily connected to any neuron at an $(i+1)^{th}$ layer.

Although the DNN seems complex, the DNN is actually not complex in terms of work at each layer, and is simply represented as the following linear relationship expression: $\vec{y}=\alpha(W\cdot\vec{x}+\vec{b})$, where $\vec{x}$ is an input vector, $\vec{y}$ is an output vector, $\vec{b}$ is a bias vector, W is a weight matrix (which is also referred to as a coefficient), and $\alpha(\ )$ is an activation function. At each layer, the output vector $\vec{y}$ is obtained by performing such a simple operation on the input vector $\vec{x}$. Because there is a plurality of layers in the DNN, there are also a plurality of coefficients W and a plurality of bias vectors $\vec{b}$. Definitions of the parameters in the DNN are as follows: The coefficient W is used as an example. It is assumed that in a DNN with three layers, a linear coefficient from the fourth neuron at the second layer to the second neuron at the third layer is defined as $W_{24}^3$. The superscript 3 indicates a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $W_{jk}^L$.

It should be noted that there is no parameter W at the input layer. In the deep neural network, more hidden layers make the network more capable of describing a complex case in the real world. Theoretically, a model with more parameters indicates higher complexity and a larger "capacity", and indicates that the model can be used to complete a more complex learning task. A process of training the deep neural network is a process of learning a weight matrix, and a final objective of training is to obtain weight matrices (weight matrices formed by vectors W at many layers) of all layers of a trained deep neural network.

(3) Convolutional Neural Network (CNN)

The convolutional neural network is a deep neural network with a convolutional architecture. The convolutional neural network includes a feature extractor including a convolution layer and a sub-sampling layer. The feature extractor may be considered as a filter. A convolution process may be considered as performing convolution by using a trainable filter and an input image or a convolution feature map. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neurons arranged in a rectangular form. Neurons on a same feature plane share a weight, where the shared weight is a convolution kernel. Weight sharing may be understood as that an image information extraction manner is irrelevant to a location. A principle implied herein is that statistical information of a part of an image is the same as that of other parts. This means that image information learned in a part can also be used in another part. Therefore, image information obtained through same learning can be used for all locations in the image. At a same convolutional layer, a plurality of convolution kernels may be used to extract different image information. Usually, a larger quantity of convolution kernels indicates richer image information reflected by a convolution operation.

The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

Figure 3:
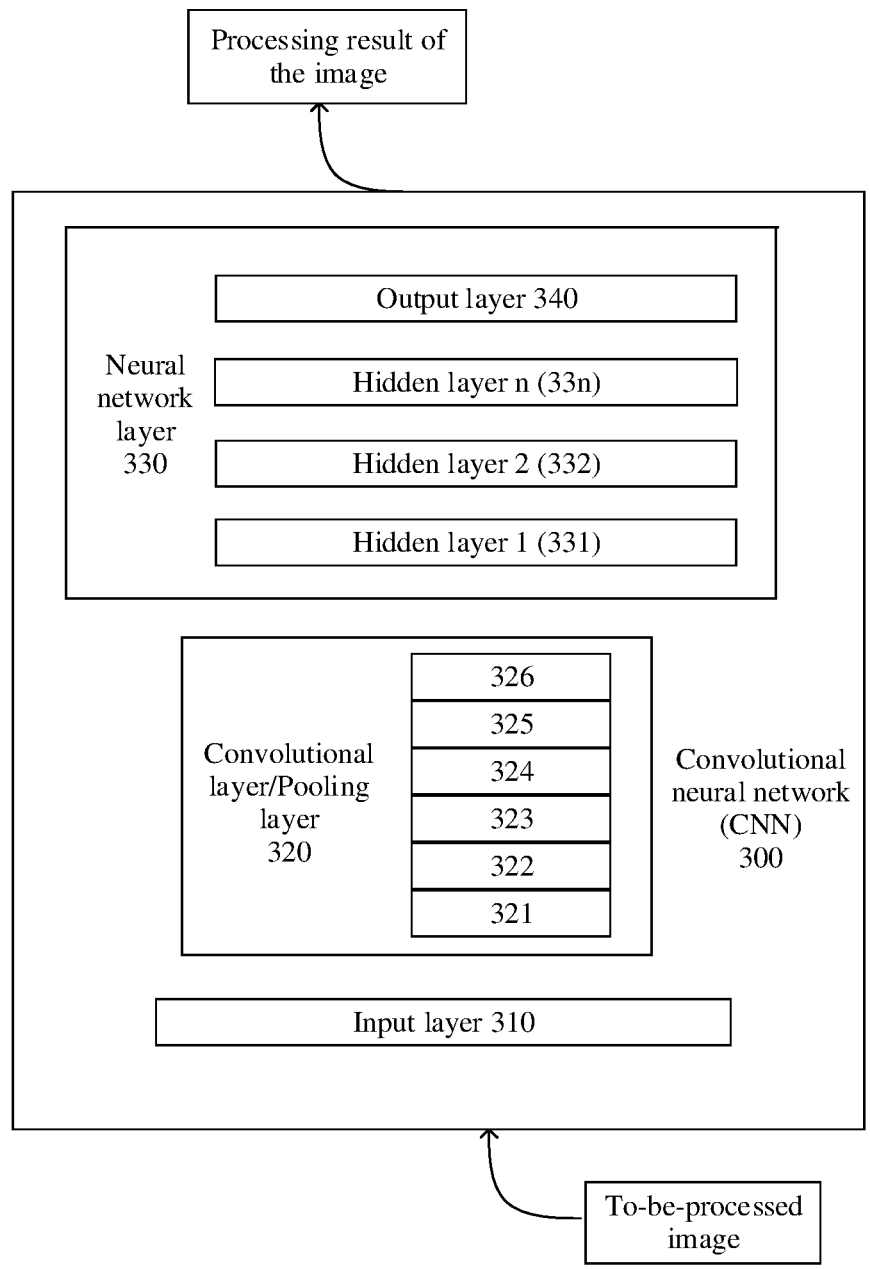
FIG. 3 is a schematic diagram of a structure of a convolutional neural network according to an embodiment of this application.

A structure of a convolutional neural network in embodiments of this application may be shown in FIG. 3. In FIG. 3, a convolutional neural network (CNN) 300 may include an input layer 310, a convolutional layer/pooling layer 320 (the pooling layer is optional), and a neural network layer 330.

The input layer 310 may obtain a to-be-recognized image, and send the obtained to-be-recognized image to the convolutional layer/pooling layer 320 and the subsequent neural network layer 330 for processing, to obtain a recognition result of a category of the image.

The following describes in detail a structure of the layer in the CNN 300 in FIG. 3.

Convolutional Layer/Pooling Layer 320:

Convolutional Layer:

As shown in FIG. 3, for example, the convolutional layer/pooling layer 320 may include layers 321 to 326. In an implementation, the layer 321 is a convolutional layer, the layer 322 is a pooling layer, the layer 323 is a convolutional layer, the layer 324 is a pooling layer, the layer 325 is a convolutional layer, and the layer 326 is a pooling layer. In another implementation, the layer 321 and the layer 322 are convolutional layers, the layer 323 is a pooling layer, the layer 324 and the layer 325 are convolutional layers, and the layer 326 is a pooling layer. To be specific, an output of a convolutional layer may be used as an input of a subsequent pooling layer, or may be used as an input of another convolutional layer to continue to perform a convolution operation.

The following uses the convolutional layer 321 as an example to describe an internal working principle of one convolutional layer.

The convolutional layer 321 may include a plurality of convolution operators. The convolution operator is also referred to as a kernel. During image recognition, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction on an input image, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a specific color of the image, and a further weight matrix is used to blur unneeded noise in the image. The plurality of weight matrices have the same size (rows× columns), and convolutional feature maps extracted from the plurality of weight matrices with the same size have a same size. Then, the plurality of extracted convolutional feature maps with the same size are combined to form an output of the convolution operation.

Weight values in these weight matrices need to be obtained through a lot of training during actual application. Each weight matrix formed by using the weight values obtained through training may be used to extract information from an input image, to enable the convolutional neural network 300 to perform correct prediction.

When the convolutional neural network 300 has a plurality of convolutional layers, a relatively large quantity of general features are usually extracted at an initial convolutional layer (for example, 321). The general feature may also be referred to as a low-level feature. As the depth of the convolutional neural network 300 increases, a feature extracted at a subsequent convolutional layer (for example, 326) becomes more complex, for example, a high-level semantic feature. A feature with higher semantics is more applicable to a to-be-resolved problem.

Pooling Layer:

Because a quantity of training parameters usually needs to be reduced, a pooling layer usually needs to be periodically introduced after a convolutional layer. To be specific, for the layers 321 to 326 in the layer 320 shown in FIG. 3, one convolutional layer may be followed by one pooling layer, or a plurality of convolutional layers may be followed by one or more pooling layers. For example, during image recognition, the pooling layer is only used to reduce a space size of an image. The pooling layer may include an average pooling operator and/or a maximum pooling operator, to perform sampling on the input image to obtain an image with a small size. The average pooling operator may be used to calculate pixel values in the image in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 330:

After processing performed at the convolutional layer/pooling layer 320, the convolutional neural network 300 is not ready to output required output information. As described above, at the convolutional layer/pooling layer 320, only a feature is extracted, and parameters resulting from an input image are reduced. However, to generate final output information (required class information or other related information), the convolutional neural network 300 needs to use the neural network layer 330 to generate an output of one required class or outputs of a group of required classes. Therefore, the neural network layer 330 may include a plurality of hidden layers (331 and 332 to 33n shown in FIG. 3) and an output layer 340. Parameters included in the plurality of hidden layers may be obtained through pre-training based on related training data of image recognition.

At the neural network layer 330, the plurality of hidden layers are followed by the output layer 340, namely, a last layer of the entire convolutional neural network 300. The output layer 340 has a loss function similar to a categorical cross entropy, and the loss function is specifically configured to calculate a prediction error. Once forward propagation (for example, propagation in a direction from 310 to 340 in FIG. 3) of the entire convolutional neural network 300 is completed, back propagation (for example, propagation in a direction from 340 to 310 in FIG. 3) is started to update a weight value and a deviation of each layer mentioned above, to reduce a loss of the convolutional neural network 300 and an error between a recognition result of a category output by the convolutional neural network 300 by using the output layer and an ideal category.

Figure 4:
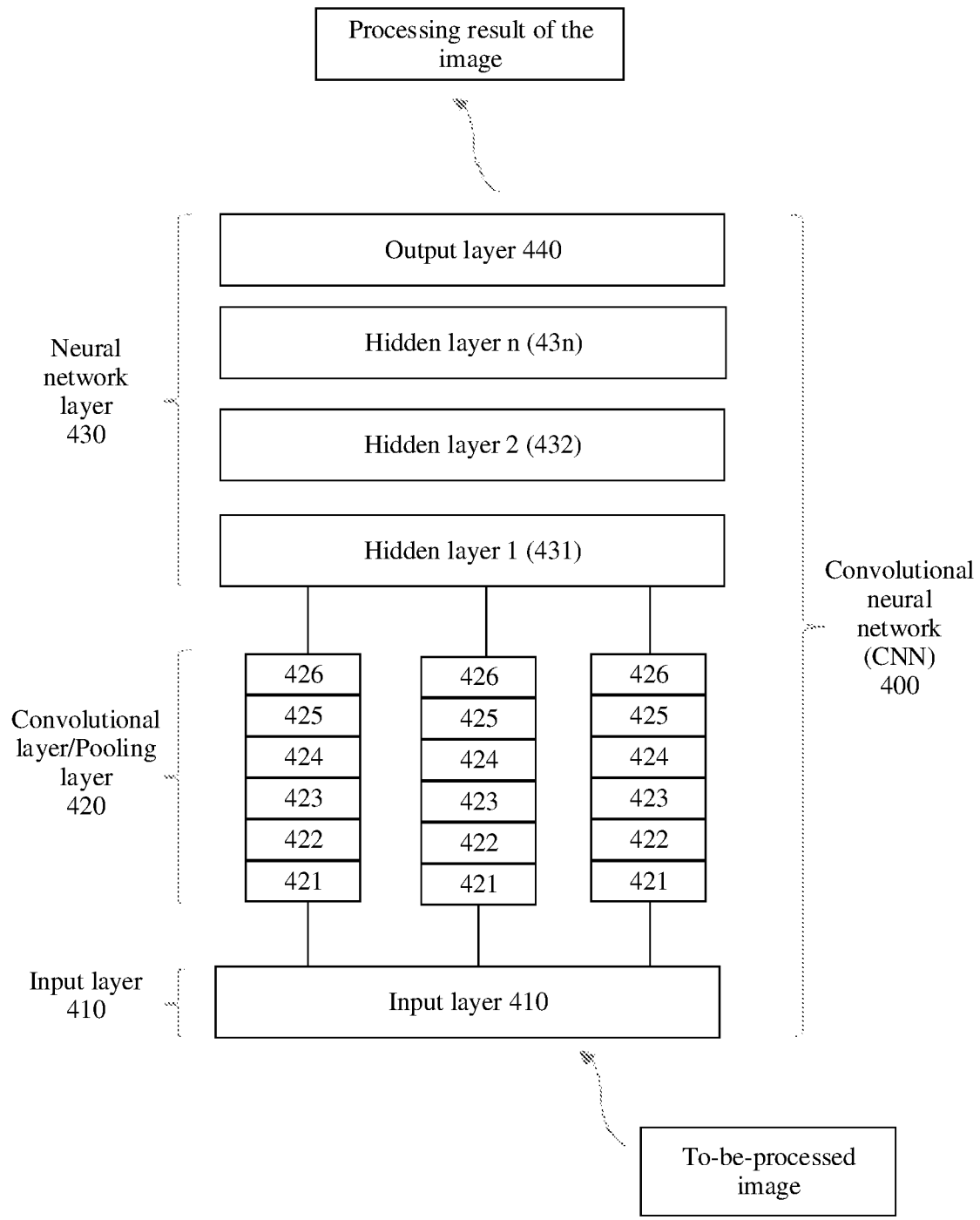
FIG. 4 is a schematic diagram of a structure of another convolutional neural network according to an embodiment of this application.

A structure of a convolutional neural network in embodiments of this application may be shown in FIG. 4. In FIG. 4, a convolutional neural network (CNN) 400 may include an input layer 410, a convolutional layer/pooling layer 420 (the pooling layer is optional), and a neural network layer 430. Compared with FIG. 3, in FIG. 4, at the convolutional layer/pooling layer 420, a plurality of convolutional layers/pooling layers (421 to 426) are in parallel, and extracted features are input to the neural network layer 430 for processing. The neural network layer 430 may include a plurality of hidden layers: a hidden layer 1 to a hidden layer n, which may be denoted as 431 to 43n.

It should be noted that the convolutional neural network shown in FIG. 3 and the convolutional neural network shown in FIG. 4 are merely two example convolutional neural networks used in embodiments of this application. During specific application, the convolutional neural network used in embodiments of this application may alternatively exist in a form of another network model.

Figure 5:
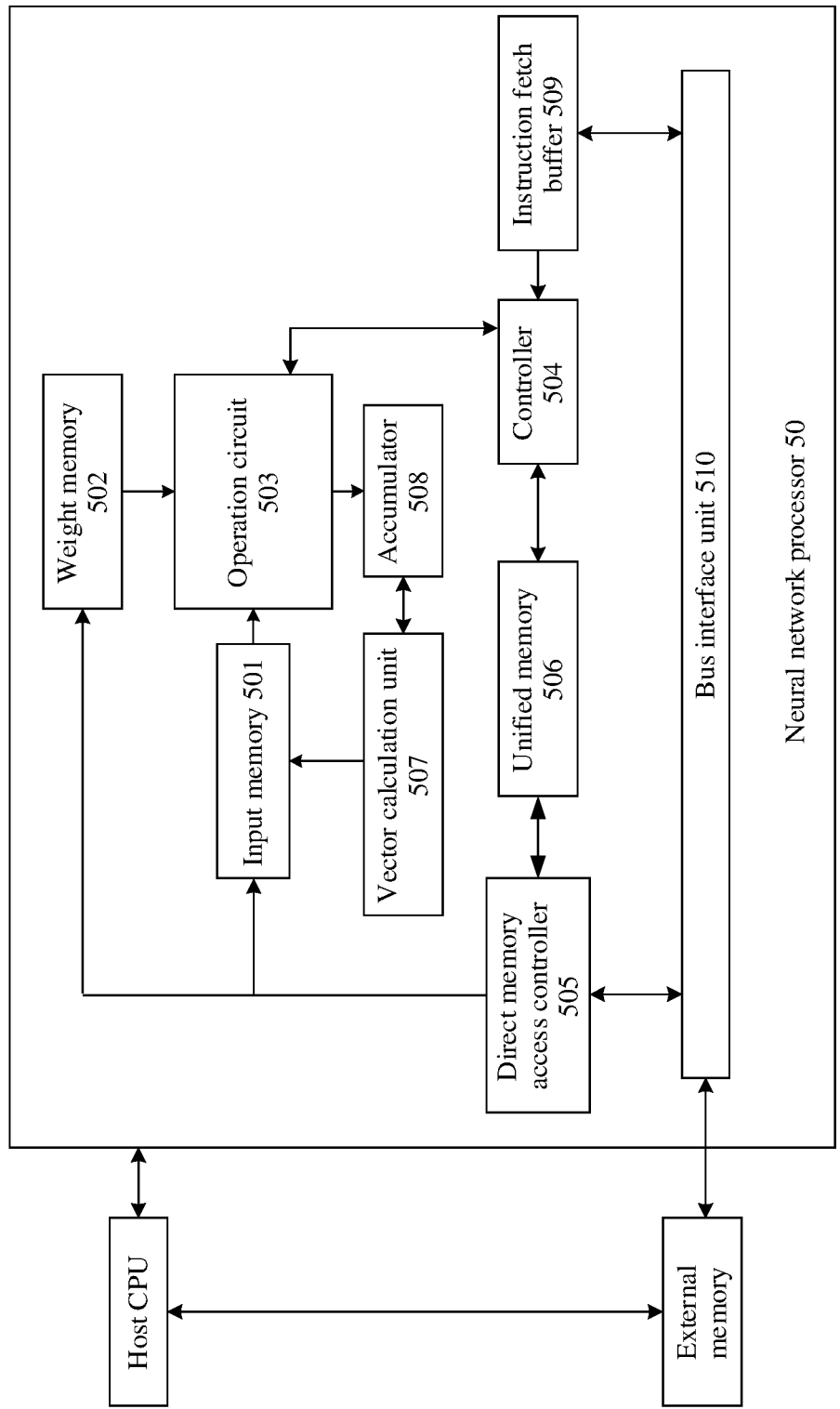
FIG. 5 is a schematic diagram of a hardware structure of a chip according to an embodiment of this application.

FIG. 5 is a schematic diagram of a hardware architecture of a chip configured to run or train an object recognition model according to an embodiment of this application. The chip includes a neural network processing unit 50. The chip may be disposed in the execution device 210 shown in FIG. 2, to complete calculation work of the processing module 211. The chip may alternatively be disposed in the training device 220 shown in FIG. 2, to complete training work of the training device 220 and output the object recognition model 201. Algorithms at all layers of the convolutional neural network shown in FIG. 3 and FIG. 4 may be implemented in the chip shown in FIG. 5.

The neural network processing unit (NPU) 50 serves as a coprocessor, and may be disposed on a host central processing unit (CPU) (host CPU). The host CPU assigns a task. A core part of the NPU is an operation circuit 503, and a controller 504 controls the operation circuit 503 to extract data in a memory (a weight memory or an input memory) and perform an operation.

In some implementations, the operation circuit 503 includes a plurality of processing engines (process engine, PE) inside. In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit fetches, from a weight memory 502, data corresponding to the matrix B, and caches the data on each PE in the operation circuit. The operation circuit fetches data of the matrix A from an input memory 501, to perform a matrix operation on the matrix B, and stores an obtained partial result or an obtained final result of the matrix in an accumulator 508.

A vector calculation unit 507 may perform further processing such as vector multiplication, vector addition, an exponent operation, a logarithm operation, or value comparison on an output of the operation circuit. For example, the vector calculation unit 507 may be configured to perform network calculation, such as pooling, batch normalization, or local response normalization at a non-convolutional/non-FC layer in a neural network.

In some implementations, the vector calculation unit 507 can store a processed output vector in a unified memory 506. For example, the vector calculation unit 507 may apply a non-linear function to an output, for example, a vector of an accumulated value, of the operation circuit 503 to generate an activation value. In some implementations, the vector calculation unit 507 generates a normalized value, a combined value, or both a normalized value and a combined value. In some implementations, the processed output vector can be used as an activated input to the operation circuit 503, for example, the processed output vector can be used at a subsequent layer of the neural network.

The unified memory 506 is configured to store input data and output data.

For weight data, a direct memory access controller (DMAC) 505 directly transfers input data in an external memory to the input memory 501 and/or the unified memory 506, stores weight data in the external memory in the weight memory 502, and stores data in the unified memory 506 in the external memory.

A bus interface unit (BIU) 510 is configured to implement interaction between the host CPU, the DMAC, and an instruction fetch buffer 509 by using a bus.

The instruction fetch buffer 509 connected to the controller 504 is configured to store an instruction used by the controller 504.

The controller 504 is configured to invoke the instruction cached in the instruction fetch buffer 509, to control a working process of an operation accelerator.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM for short), a high bandwidth memory (HBM), or another readable and writable memory.

An operation of each layer in the convolutional neural network shown in FIG. 3 or the convolutional neural network FIG. 4 may be performed by the operation circuit 503 or the vector calculation unit 507.

Figure 6:
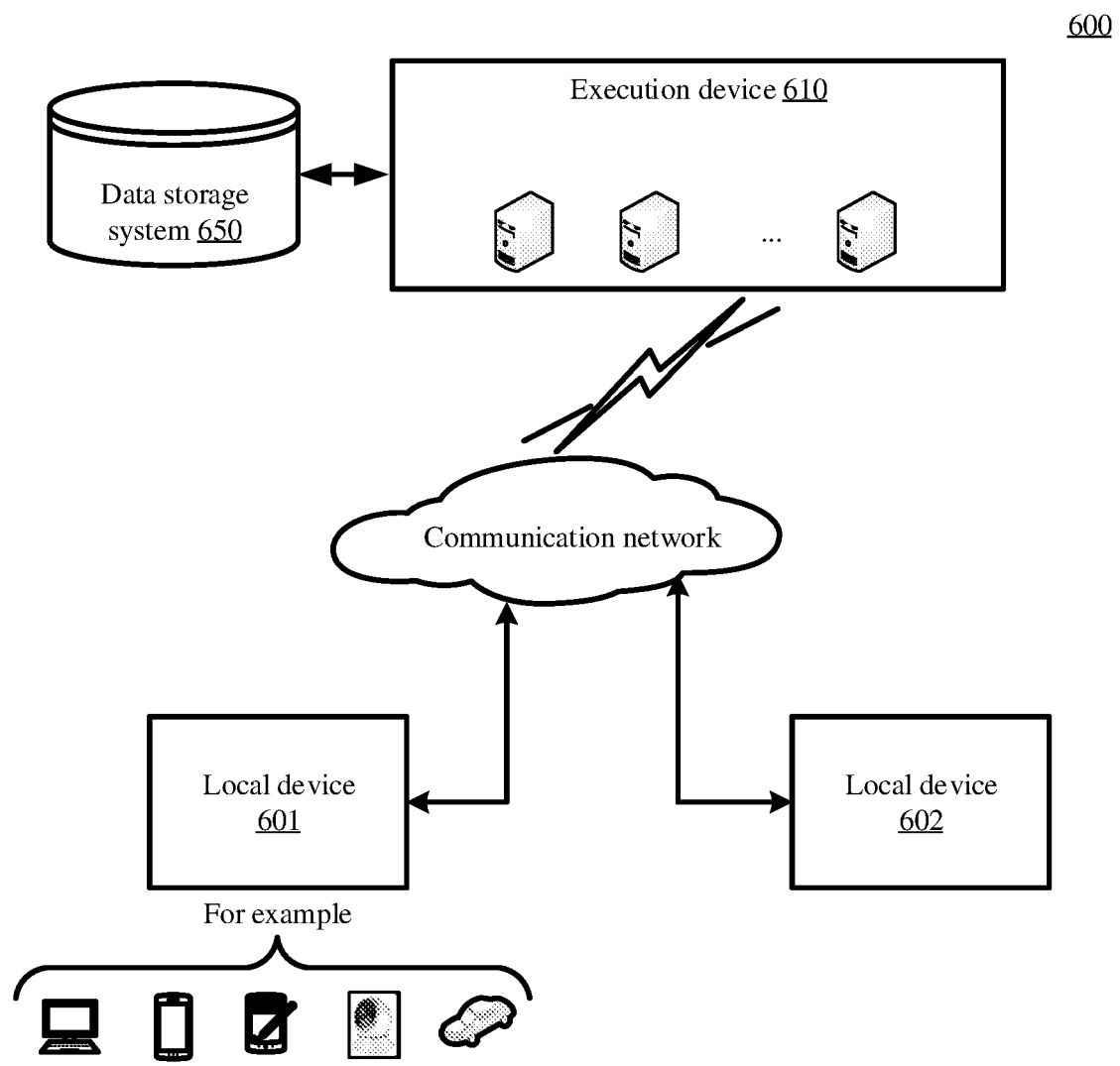
FIG. 6 is a schematic diagram of a system architecture according to an embodiment of this application.

FIG. 6 shows a system architecture 600 according to an embodiment of this application. The system architecture includes a local device 601, a local device 602, an execution device 610, and a data storage system 650. The local device 601 and the local device 602 are connected to the execution device 610 by using a communication network.

The execution device 610 may be implemented by one or more servers. Optionally, the execution device 610 may cooperate with another computing device, for example, a device such as a data memory, a router, or a load balancer. The execution device 610 may be disposed on one physical site, or distributed on a plurality of physical sites. The execution device 610 may implement an object recognition method in embodiments of this application by using data in the data storage system 650 or by invoking program code in the data storage system 650.

A user may operate user equipment (for example, the local device 601 and the local device 602) to interact with the execution device 610. Each local device may be any computing device, such as a personal computer, a computer workstation, a smartphone, a tablet computer, an intelligent camera, a smart automobile, another type of cellular phone, a media consumption device, a wearable device, a set-top box, or a game console.

The local device of each user may interact with the execution device 610 through a communication network of any communication mechanism/communication standard. The communication network may be a wide area network, a local area network, a point-to-point connection, or any combination thereof.

In an implementation, the local device 601 and the local device 602 capture a to-be-recognized image, and send the to-be-recognized image to the execution device 610. The execution device 610 recognizes the to-be-recognized image by using an object recognition model deployed on the execution device 610, and returns a recognition result to the local device 601 or the local device 602.

In another implementation, an object recognition model may be directly deployed on the local device 601 or the local device 602. In this way, after capturing a to-be-recognized image by using a photographing apparatus, the local device 601 or the local device 602 may recognize the to-be-recognized image by using the object recognition model.

A current object recognition model is usually trained by using a large quantity of object images of known categories, so that the object recognition model can learn unique features of different categories of objects, and record correspondences between the features of different categories of objects and category labels. Therefore, when an object image is input into the trained object recognition model during actual service application, a category of an object can be inferred based on the object image, to perform object recognition.

For example, when performing object detection by using a terminal device such as a mobile phone, a user may recognize, by using a trained object recognition model, a category of an object in an image photographed by the terminal such as the mobile phone.

The method of training the object recognition model to recognize a category of an object has the following problem: The object recognition model can recognize only a category of an object appearing during training. If a category of a target object does not belong to categories of objects appearing during training, the object recognition model cannot recognize the target object. Alternatively, after the object recognition model recognizes a category of an object, the recognition result does not meet a requirement of a user. For example, the object recognition model recognizes an object in an image as a dog, but a recognition result required by the user is "Husky".

To resolve the problem, the object recognition model may be updated by the user during usage, after the object recognition model is trained, so that a recognition result of the object recognition model can meet a requirement of the user. Therefore, this application provides a method for updating an object recognition model.

The following first describes examples of several application scenarios of the method for updating an object recognition model in this application.

Application Scenario 1:

When using a robot, a user expects that the robot can recognize an object that the user is interested in.

For example, if the user expects that the robot can recognize a Doraemon doll that he/she holds, the user may point to the doll and say, "This is Doraemon". The robot simultaneously obtains visual information and a voice instruction of the user, obtains knowledge "this is Doraemon" based on the voice instruction of the user, obtains, based on the visual information, a feature of an image corresponding to "Doraemon", generates a correspondence between a category label "Doraemon" and the corresponding image, and inputs the category label "Doraemon" and the corresponding image to a model of the robot. In this way, the updated model has a capability of recognizing "Doraemon".

Application Scenario 2:

When a user uses a robot to recognize an object that the user is interested in, a category of the object output by the robot does not meet a requirement of the user, and the user informs the robot of a more accurate category of the object.

For example, the user points to Peppa Pig, and the robot obtains visual information, and outputs a category "pig" based on the visual information. The category does not meet a requirement of the user, and the user says to the robot, "No, this is Peppa Pig." The robot simultaneously obtains visual information and a voice instruction of the user, generates a correspondence between a category label "Peppa Pig" and a corresponding image, and inputs the category label "Peppa Pig" and the corresponding image to a model of the robot. The updated model of the robot has a capability of recognizing "Peppa Pig".

Application Scenario 3:

When a user uses a robot to recognize an object that the user is interested in, a category of the object output by the robot is incorrect, and the user informs the robot of a correct category of the object.

For example, a child says, "Xiaoyi, help me recognize an object", to a robot for kids, and the robot says, "Please put the object in front of me." The child puts the object in front of the robot. The robot recognizes a category of the object and says, "I guess this is an apple, right?" The child says, "No, this is an orange." The robot adds a feature corresponding to the orange and a category label "orange" to a model, and says, "I remember, and I'll know the orange the next time I see it."

The following describes a schematic flowchart of the method for updating an object recognition model in this application.

Figure 7:
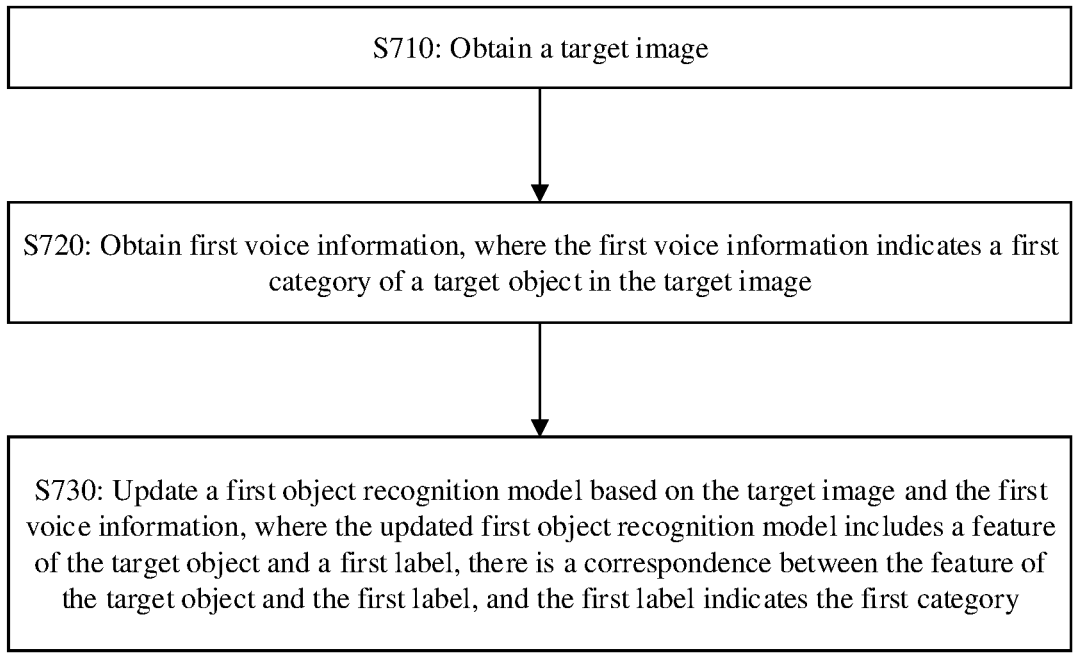
FIG. 7 is a schematic flowchart of a method for updating an object recognition model according to an embodiment of this application.

FIG. 7 is a schematic flowchart of a method for updating an object recognition model according to an embodiment of this application. As shown in FIG. 4, the method may include S710, S720, and S730. The method may be performed by the foregoing execution device or local device.

S710: Obtain a target image.

The target image may be an image obtained through capturing visual information by a photographing device in an intelligent device. The target image may include one or more objects.

S720: Obtain first voice information, where the first voice information indicates a first category of a target object in the target image.

The target object is an object, in the target image, that a user is interested in, namely, an object whose category the user wants to learn of. The first voice information may be voice information captured by the voice device in the intelligent device, for example, may be voice information captured by the voice device such as a microphone.

After capturing a voice instruction input by the user, the intelligent device may obtain knowledge in the voice instruction, to obtain the first voice information. For example, the knowledge in the voice instruction may be obtained by using a natural language understanding method, to obtain the first voice information.

For example, the first voice information may include the following content, "this is A", where A is a category label of the object. For example, "this is Peppa Pig", "this is an orange", and "this is Doraemon", where Peppa Pig, an orange, or Doraemon is a first category of the target object in the target image.

S730: Update a first object recognition model based on the target image and the first voice information, where the updated first object recognition model includes a feature of the target object and a first label, there is a correspondence between the feature of the target object and the first label, and the first label indicates the first category.

In other words, the first label indicating the first category may be generated, and the feature of the target object, the first label, and the correspondence between the feature of the target object and the first label are added to the first object recognition model.

The first object recognition model is used to recognize a category of an object in an image. In some examples, after an image is input, the first object recognition model may output a category label of an object in the image.

The first object recognition model may be a neural network model. In some examples, the first object recognition model may be obtained through training by using a training set. The training set may include a large quantity of images. The images may include objects of different categories, and the categories of the objects are known, that is, labels corresponding to the images in the training set are known. For a method for obtaining the first object recognition model through training by using the training set, refer to the conventional technology. Details are not described herein.

For example, the training set of the first object recognition model may include an ImageNet dataset and a label corresponding to the dataset. The ImageNet dataset is a public dataset used in the ImageNet Large Scale Visual Recognition Challenge (ILSVRC).

For another example, the training set of the first object recognition model may include an OpenImage dataset and a label corresponding to the dataset.

The feature of the target object may be obtained through performing feature extraction on the target image by using the first object recognition model. For example, the first object recognition model may include a feature extraction submodel, and the feature extraction submodel is configured to extract the feature in the target image. The feature extraction submodel may be a dense convolutional neural network, a dilated neural network, a residual neural network, or the like.

In the method in this embodiment, a feature of an object and a category label corresponding to the feature are added to the object recognition model, so that the object recognition model can recognize a category of object. This improves a recognition rate of the object recognition model, and further improves intelligence of the object recognition model.

In addition, according to the method in this embodiment, a user can indicate a category of a target object by using voice. Therefore, the user can update the object recognition model more easily.

In some possible implementations, in S730, the updating a first object recognition model based on the target image and the first voice information may include: determining, based on the target image and the first voice information, that the first category indicated by the first voice information is a target confidence of an actual category of the target object; and when the target confidence is greater than or equal to a preset confidence threshold, adding the feature of the target object, the first label, and the correspondence between the feature and the first label to the first object recognition model.

In the implementations, the feature of the target object, the first label, and the correspondence are updated to the first object recognition model only when it is determined that the confidence of the first category indicated by the user for the target object by using the voice is high.

In other words, when it is determined that the confidence of the first category indicated by the user for the target object by using the voice is low, for example, less than the preset confidence threshold, the first object recognition model may not be updated. For example, when the first label in the first voice information input by the user by using the voice is incorrect, when an error occurs in obtaining the first voice information in the voice of the user, or when the obtained target object is not an object that is specified by the user for recognition, the first object recognition model may not be updated.

The implementations can improve recognition accuracy of the updated first object recognition model, and further make the first object recognition model more intelligent.

In some possible implementations, the target confidence may be determined based on a first probability, and the first probability is a probability, obtained by a second object recognition model through inferring the category of the target object, that indicates that the category label of the target object is a first category of label. The second object recognition model is configured to recognize an image, to obtain a probability that a category label of an object in the image is each of at least one category of label. The at least one category of label is obtained through clustering category labels in the first object recognition model, the at least one category of label includes the first category of label, and a similarity between the first label and the first category of label is greater than a similarity between the first label and another category of label in the at least one category of label.

In the implementation, the second object recognition model may be a neural network, for example, a convolutional neural network.

The following first describes an example of a method for obtaining the at least one category of label.

In an example method, a category label in the first object recognition model may be first obtained, and a semantic feature of each category label in the first object recognition model is extracted. Then, all category labels in the first object recognition model are clustered based on semantic features of all category labels, to obtain the at least one category of label. Each of the at least one category of label may include one or more of all category labels in the first object recognition model.

For example, a BERT model may be used to extract the semantic feature of each category label in the first object recognition model. A full name of BERT is bidirectional encoder representations from transformers.

For example, the category labels in the first object recognition model may be clustered based on the semantic features of the category labels in the first object recognition model by using a k-means method, to obtain the at least one category of label.

Figure 8:
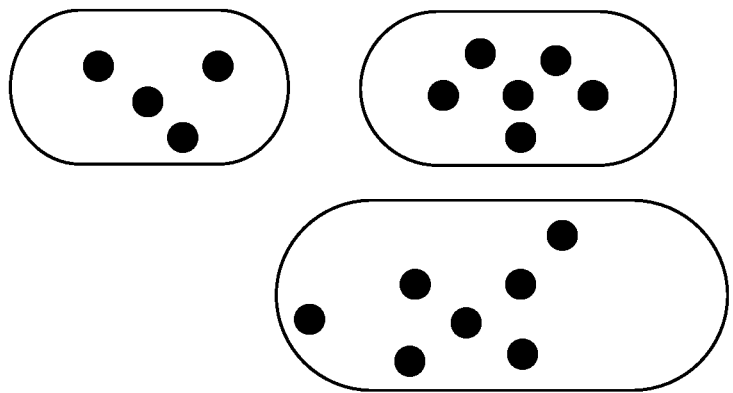
FIG. 8 is a schematic diagram of clustering labels based on label features to obtain at least one category of label.

FIG. 8 is a schematic diagram of clustering labels based on label features to obtain the at least one category of label.

In FIG. 8, one point indicates one label feature, and one ellipse indicates one category of label.

For example, the training set of the first object recognition model includes the ImageNet dataset. Feature extraction may be performed on 1000 categories of labels corresponding to the ImageNet dataset by using the BERT model, and the 1000 categories of labels are clustered into 200 categories of labels by using the k-means method based on features of the 1000 categories of labels. The 200 categories of labels are the at least one category of label.

The following describes an example of a method for obtaining the second object recognition model.

In an example method, the training set of the first object recognition model may be obtained, and a category label of each piece of training data in the training set is changed to a category of label corresponding to the category label, to obtain a new training set. Then, a classification model is trained by using the new training set, to obtain the second object recognition model. When an image is input to the second object recognition model obtained through training, a category of label corresponding to an object in the image can be inferred.

For example, the training set of the first object recognition model includes the ImageNet dataset, and the 200 categories of labels are obtained through clustering. A mobilenet model is trained by using the ImageNet dataset and the 200 categories of labels, to obtain the second object recognition model. A label corresponding to each image in the ImageNet dataset is mapped from the original 1000 categories of labels to corresponding labels in the 200 categories of labels.

With reference to FIG. 9, the following describes an example of an implementation of obtaining the target confidence and updating the first object recognition model based on the target confidence. As shown in FIG. 9, the method may include S910 to S940.

S910: Determine, based on a similarity between a first label and each of at least one category of label, that the first label is a first category of label in the at least one category of label, where the first label indicates a first category of a target object.

In an example method, the similarity between the first label and each of the at least one category of label may be obtained, and a category of label with a maximum similarity is determined as the first category of label.

When the similarity between the first label and each of the at least one category of label is obtained, in an example implementation, a similarity between the first label and a central label of each category of label may be obtained, and the similarity is used as the similarity between the first label and each category of label.

The similarity between the first label and the central label of each category of label may be measured by using a distance between a semantic feature of the first label and a semantic feature of the central label of each category of label. A smaller distance indicates a higher similarity.

A calculation manner of the distance between the semantic feature of the first label and the semantic feature of the central label of each category of label is as follows: extracting the semantic feature of the first label; extracting the semantic feature of the central label; and calculating the distance between the semantic feature of the first label and the semantic feature of the central label.

For example, a feature vector may be obtained by using the BERT model through extracting the semantic feature of the first label. Another feature vector may be obtained by using the BERT model through extracting the semantic feature of the center label. The distance between the two feature vectors is calculated, for example, a cosine distance or a Euclidean distance.

When the similarity between the first label and each of the at least one category of label is obtained, in another example implementation, a similarity between the first label and each label in each category of label may be obtained, an average similarity is calculated, and the average similarity is used as the similarity between the first label and each category of label.

S920: Infer a category of the target object by using a second object recognition model, to obtain a first probability that a category label of the target object is the first category of label.

For example, a target image is input into the second object recognition model. After performing inference, the second object recognition model outputs labels of categories to which the target object belongs and a probability that the target object belongs to each category. The labels include the first category of label. In other words, the second object recognition model may output the first probability that the category label of the target object is the first category of label.

S930: Determine, based on the first probability, that the first category is a target confidence of an actual category of the target object.

In other words, the target confidence that the first label indicated by a user is the actual category label of the target object is determined based on the first probability that the category label of the target object is the first category of label.

For example, the first probability may be used as the target confidence. It is clear that another operation may be performed based on the first probability, to obtain the target confidence. This is not limited in this embodiment.

S940: When the target confidence is greater than or equal to a confidence threshold, add a feature of the target object and the first label to the first object recognition model.

In this embodiment, a category of label to which the first label specified by the user belongs is determined, a probability that the target object belongs to a category identified by the category of label is inferred by using a trained classification model, and the confidence that the first label specified by the user is the actual category label of the target object is determined based on the probability. In addition, only when the confidence exceeds the preset confidence threshold, it is considered that the first label specified by the user is reliable, and then a first object recognition model is updated. This can improve recognition accuracy of the updated first object recognition model.

Figure 10:
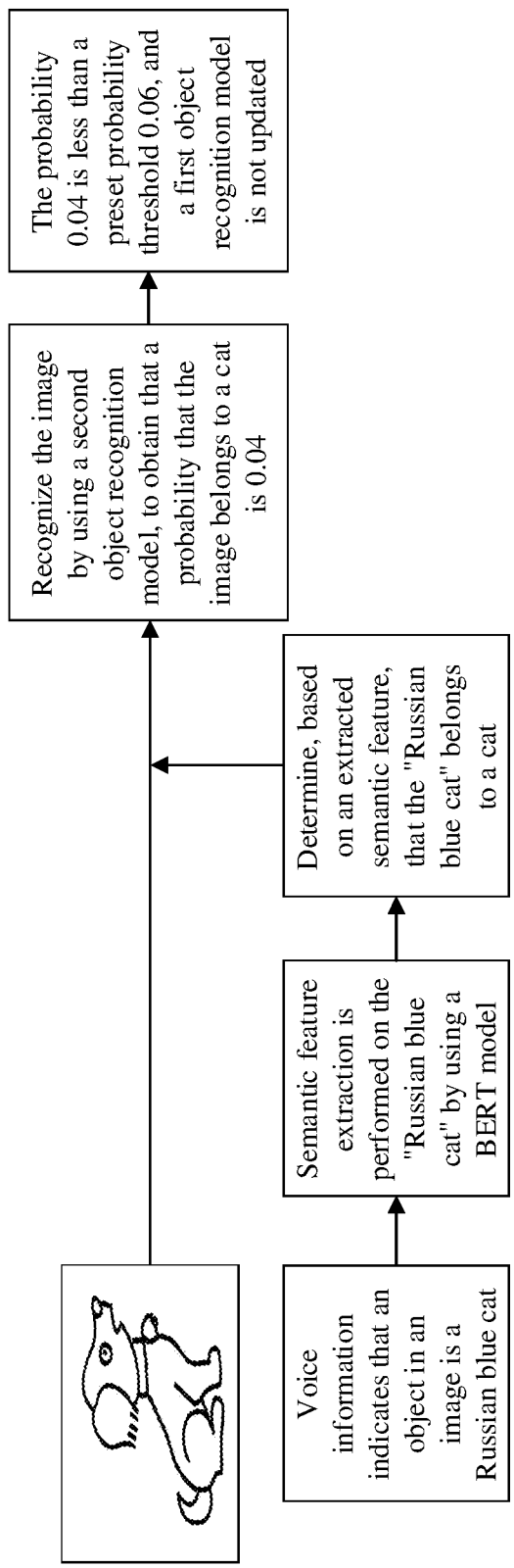
FIG. 10 is a schematic flowchart of a method for updating an object recognition model according to another embodiment of this application.

As shown in FIG. 10, the first label is a "Russian blue cat". Semantic feature extraction is performed on the first label by using a BERT model, to obtain a first semantic feature. It is determined, based on the first semantic feature, that the "Russian blue cat" belongs to a label "cat", that is, the first category of label is a label "cat". The target object in the target image is a dog. The target image is inferred by using the classification model, to learn that the first probability that the label of the target object in the target image is the label "cat" is 0.04; and the first probability is used as the target confidence. Because the target confidence 0.04 is less than the preset confidence threshold 0.06, the first object recognition model is not updated.

It can be learned from the example shown in FIG. 10 that the first object recognition model is updated based on the target confidence in this application, so that when the user indicates an incorrect label for the target object, the incorrect label is not updated to the first object recognition model. This avoids incorrect recognition of the first object recognition model.

It may be understood that the first label in the method shown in FIG. 9 is not limited to being indicated by the user by using first voice information, and may be indicated by the user in any manner, for example, may be indicated by the user by using text information.

In some possible scenarios, the target image may include a plurality of objects, but the user is interested in only one of the plurality of objects. In other words, the user expects one of the plurality of objects to be recognized, or the first label indicated by the user by using voice is an expected label of one of the plurality of objects, and the object that the user is interested in is the target object.

In this scenario, a target object that the user expects to be recognized needs to be determined from the target image, to accurately learn of the target object corresponding to the first label indicated by the user. This helps improve recognition accuracy of the updated first object recognition model.

For the foregoing scenario, this application further provides a method for determining a target object from a target image. In an implementation of determining the target object from the target image, one or more categories of objects may be specified in advance, and it is specified that the one or more categories of objects indicate a target object in a target image, that is, an object in a direction indicated by the one or more categories is the target object. In this embodiment, for ease of description, the one or more pre-specified objects are referred to as a first object.

The pre-specified objects described herein may include a hand and/or an eyeball. It is clear that there may be another category. This is not limited in this application.

The following describes how to determine the target object from the target image based on the first object.

An implementation of determining the target object from the target image based on the first object may include Step 1 to Step 5.

Step 1: Perform target detection on the target image, to obtain a location and a bounding box of the first object.

For example, the first object includes a hand. A location and a bounding box of a hand may be detected by using a single shot multi-box detector (SSD).

For example, the first object includes an eyeball. A location and a bounding box of a face may be detected by using an SSD.

Step 2: Determine, based on an image in the bounding box, a direction indicated by the first object.

For example, the first object includes a hand. The hand in the bounding box may be classified by using a trained classification model, to obtain a direction indicated by the hand. For example, finger images may be classified into 36 categories, and a spacing between directions indicated by two adjacent categories of finger images is 10 degrees. Correspondingly, hand images are also classified into 36 categories, and each category of finger image corresponds to one direction indicated by the hand.

For example, the first object includes an eyeball. The eyeball in the bounding box of a face may be classified by using a trained classification model, to obtain a direction indicated by the eyeball. Eyeball images may be classified into 36 types, and a spacing between directions indicated by two adjacent categories of eyeball images is 10 degrees.

Step 3: Perform visual saliency detection on the target image, to obtain a plurality of salient regions in the target image.

An implementation of obtaining the salient regions in the target image may include: calculating a saliency probability map of the target image; inputting the saliency probability map to a model for generating a body region proposal, to obtain the body region proposal; dividing the target image into a body pixel set and a non-body pixel set based on the saliency probability map of the target image, where a body region corresponds to the body pixel set; calculating an average saliency probability of the body pixel set and an average saliency probability of the non-body pixel set, calculating a ratio of the two probabilities, and using the ratio as a saliency score of the body region; and using a body region whose saliency score is greater than a preset score threshold as the salient region, where if saliency scores of a plurality of body regions are greater than the score threshold, the plurality of salient regions are obtained.

In some implementations, the target image is input to a model for generating a saliency probability map, and the saliency probability map of the target image is generated based on an output of the model for generating a saliency probability map. The saliency probability map of the target image may include probabilities in a one-to-one correspondence with pixel values in the target image, and each probability indicates a saliency probability of a location of a pixel value corresponding to the probability. The model for generating a body region proposal may be obtained through training by using a saliency detection dataset.

For example, the model for generating a saliency probability map may be a binary division model. After the target image is input to the binary division model, the division model may divide two categories of objects in the target image: a salient object and a background. In addition, the division model may output a probability that each pixel in the target image belongs to a corresponding category, where the probabilities form the saliency probability map.

In some implementations, the model for generating a body region proposal may obtain the body region proposal of the target image by using a method such as selective search or connected component analysis.

Step 4: Determine a target salient region from the plurality of salient regions based on the direction indicated by the first object and a location of the bounding box, where the target salient region is a salient region, in the plurality of salient regions, that is in the direction indicated by the first object and that is closest to the bounding box.

In other words, a salient region that is in the direction indicated by the first object and that is closest to the first object is determined as the target salient region.

For example, the first object includes a hand. Salient regions in a direction indicated by the hand are obtained, distances between the salient regions and the hand are calculated, and finally a salient region with a minimum distance is determined as the target salient region.

Figure 11:
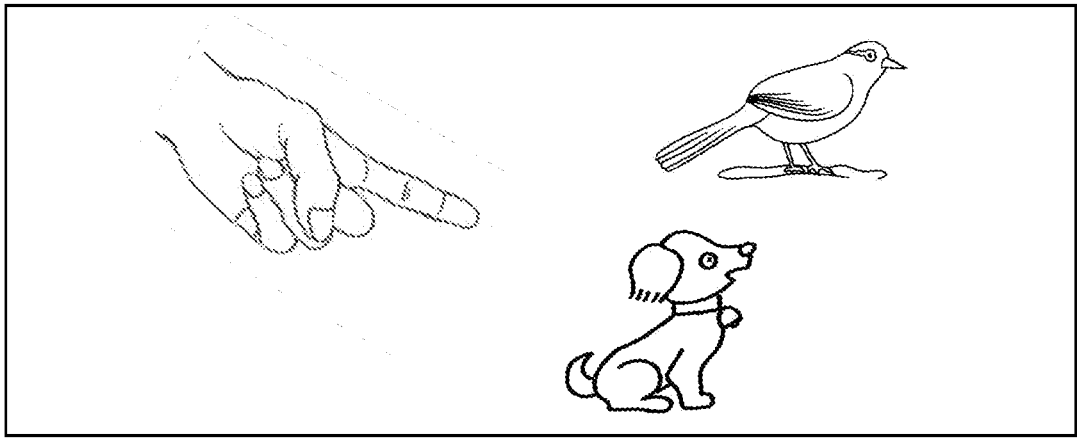
FIG. 11 is a schematic diagram of a method for determining a body region in a gesture indication direction.

As shown in FIG. 11, compared with a salient region 2 in the direction indicated by the finger, a salient region 1 in the direction indicated by the finger is closer to the finger. Therefore, the salient region 1 is the target salient region.

For example, the first object includes an eyeball. Salient regions in a direction indicated by the eyeball are obtained, distances between the salient regions and the eyeball are calculated, and finally a salient region with a minimum distance is determined as the target salient region. An object in the target salient region is the target object.

Step 5: Update the first object recognition model based on the target salient region.

For example, a feature of an object in the target salient region is obtained, and the feature and a first label are added to the first object recognition model.

Figure 12:
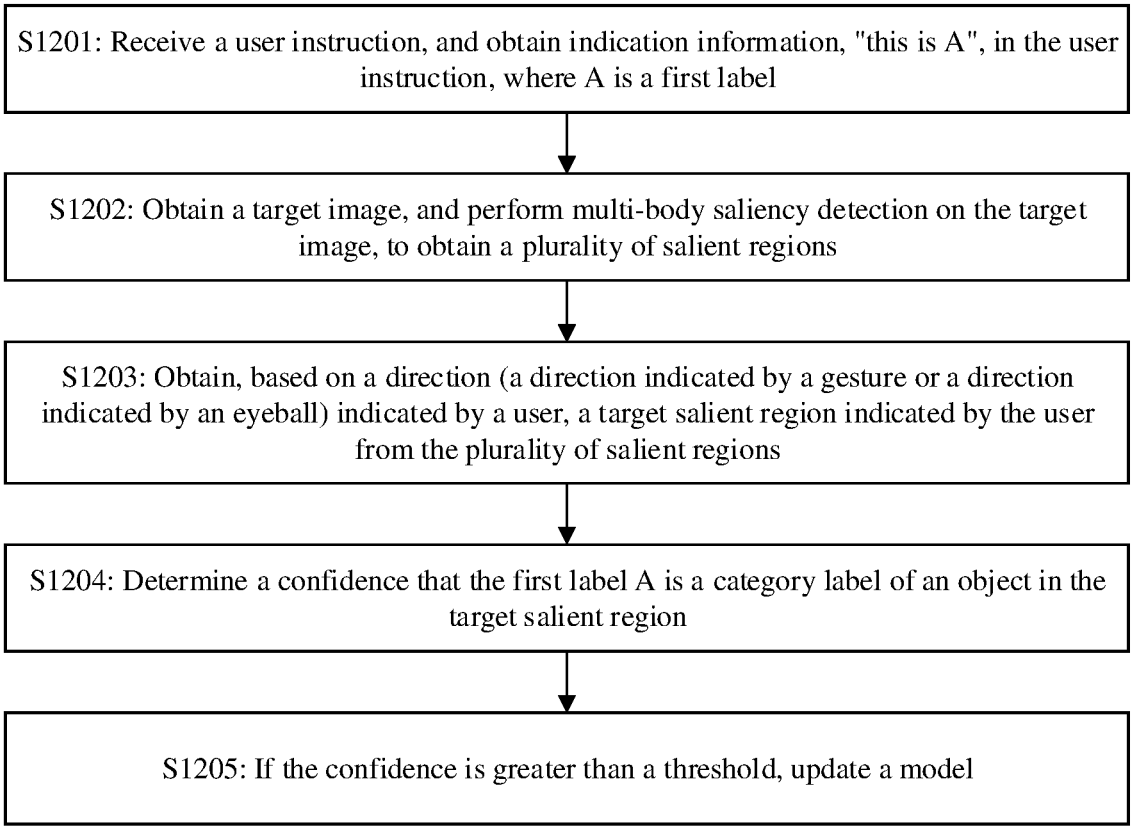
FIG. 12 is a schematic flowchart of updating an object recognition model based on a user instruction according to this application.

FIG. 12 is a schematic flowchart of updating an object recognition model based on a user instruction according to this application.

S1201: Receive a user instruction, and obtain indication information, "this is A", in the user instruction, where A is a first label.

S1202: Obtain a target image, and perform multi-body saliency detection on the target image, to obtain a plurality of salient regions.

S1203: Obtain, based on a direction (a direction indicated by a gesture or a direction indicated by an eyeball) indicated by a user, a target salient region in the direction indicated by the user from the plurality of salient regions.

S1204: Determine a confidence that the first label A is a category label of an object in the target salient region.

Features of 1000 categories of labels corresponding to an ImageNet dataset are extracted by using a BERT model, and the 1000 categories of labels are clustered into 200 categories by using k-means, to generate 200 clustering centers. The 1000 categories of object labels are mapped to 200 superclasses of labels, and 200 categories of classification models are trained by using the ImageNet dataset, the corresponding 200 superclasses of labels, and a mobilenetv2 model. A feature of the label A is extracted by using the BERT model, distances between the BERT feature of the label A and BERT feature centers corresponding to the 200 superclasses of labels are calculated, and a superclass H corresponding to a minimum distance is selected and used as a superclass of the label. The salient region is input to the mobilenetv2 model, a probability that the region belongs to the superclass H is generated, and the probability is used as a confidence fed back by the user.

S1205: If the confidence is greater than a threshold, update a model.

For example, if the confidence is less than the threshold, the model is not updated. If the confidence is greater than the threshold, the model is updated.

Figure 13:
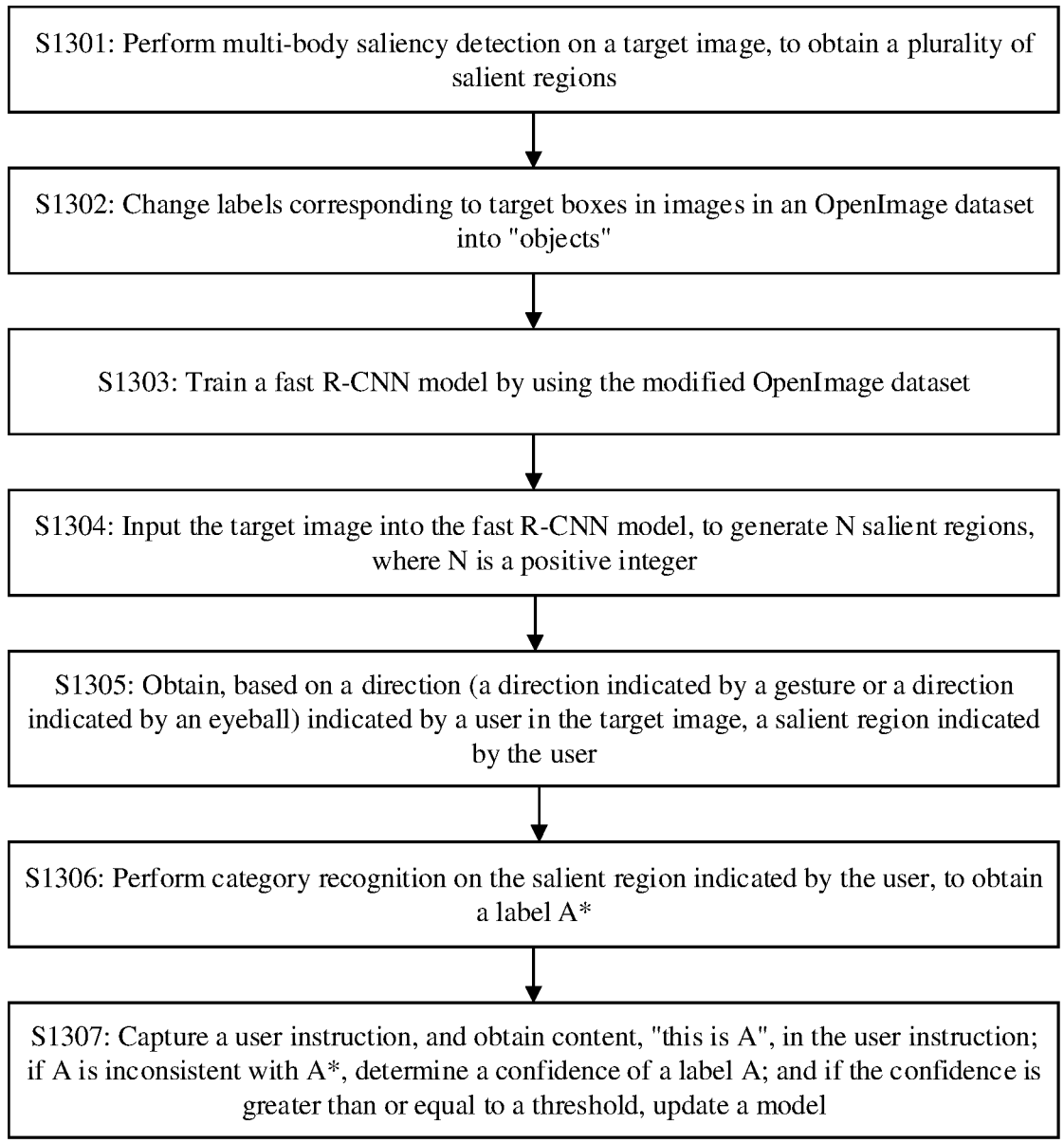
FIG. 13 is another schematic flowchart of updating an object recognition model based on a user instruction according to this application.

FIG. 13 is a schematic flowchart of updating an object recognition model based on a user instruction according to this application.

S1301: Perform multi-body saliency detection on a target image, to obtain a plurality of salient regions.

S1302: Change labels corresponding to target bounding boxes in images in an OpenImage dataset into "objects".

S1303: Train a fast R-CNN model by using the modified OpenImage dataset.

S1304: Input the target image into the fast R-CNN model, to generate N salient regions, where N is a positive integer.

S1305: Obtain, based on a direction (a direction indicated by a gesture or a direction indicated by an eyeball) indicated by a user in the target image, a salient region indicated by the user.

For example, the following steps may be performed to obtain the salient region indicated by the user. Step a: Train the fast R-CNN model by using a hand dataset, to obtain a hand detection fast R-CNN model. Step b: Train a finger direction classification model by using a finger direction dataset, where the finger direction dataset marks directions indicated by a finger, and there are 36 categories in total at a spacing of 10 degrees. Step c: Input the target image to the hand detection fast R-CNN model, to obtain a region of a hand location. Step d: Input the region of the hand location to the finger direction classification model, to obtain a direction indicated by the finger. Step e: Obtain a closest body region, from the N salient regions, in the direction indicated by the finger, and calculate a distance d1 between the closest body region and the finger. Step f: Train an SSD model by using a face detection dataset. Step g: Train an eyeball direction classification model by using an eyeball direction dataset, where the eyeball direction dataset marks directions indicated by an eyeball, and there are 36 categories in total at a spacing of 10 degrees. Step h: Input the target image to a face detection SSD model, to obtain a region of a face location. Step i: Input the region of the face location to the eyeball direction classification model, to obtain a direction indicated by the eyeball. Step j: Obtain a closest body region in the direction indicated by the eyeball, and calculate a distance d2 between the body region and the eyeball. Step k: If d1 is less than d2, use the closest body region in the direction indicated by the finger as a body region indicated by the user; or if d1 is greater than d2, use the closest body region in the direction indicated by the eyeball as a body region indicated by the user.

S1306: Perform category recognition on the salient region indicated by the user, to obtain a label A*.

S1307: Capture a user instruction, and obtain content, "this is A", in the user instruction; if A is inconsistent with A*, determine a confidence of the label A; and if the confidence is greater than or equal to a threshold, update a model.

In the object recognition method in this application, after the to-be-recognized image captured by the photographing device is obtained, recognition may be performed by using the first object recognition model obtained through updating by using any one of the foregoing methods. The object recognition method may be performed by the foregoing execution device or a local device.

For example, after the image feature of "Doraemon", the first label including the semantic feature of "Doraemon", and the correspondence between the image feature and the first label are added to the first object recognition model, when the first object recognition model is used for object recognition, if the photographing device photographs an image including "Doraemon", the first object recognition model may first extract a feature of the image, and calculate a similarity between the feature and a feature in the feature library of the first object recognition model, to determine that a category of the image is "Doraemon".

Figure 14:
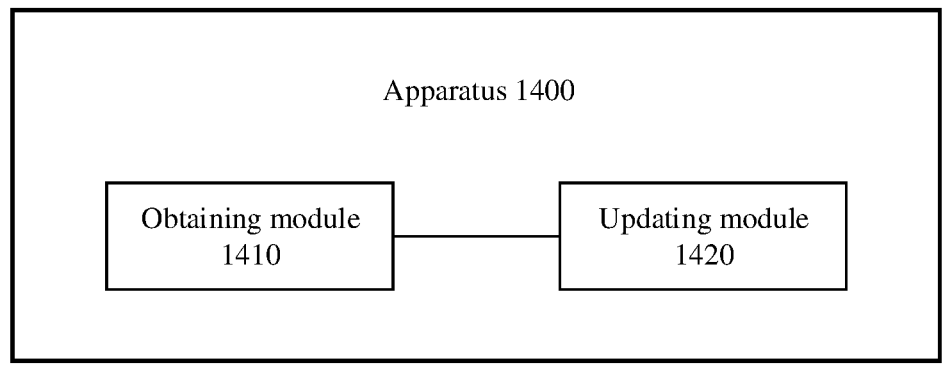
FIG. 14 is a diagram of an example of a structure of an apparatus for updating an object recognition model according to this application.

FIG. 14 is a diagram of an example structure of an apparatus 1400 for updating an object recognition model according to this application. The apparatus 1400 includes an obtaining module 1410 and an updating module 1420. In some implementations, the apparatus 1400 may be the foregoing execution device or local device.

The apparatus 1400 may implement any one of the foregoing methods. For example, the obtaining module 1410 is configured to perform S710 and S720, and the updating module 1420 is configured to perform S730.

Figure 15:
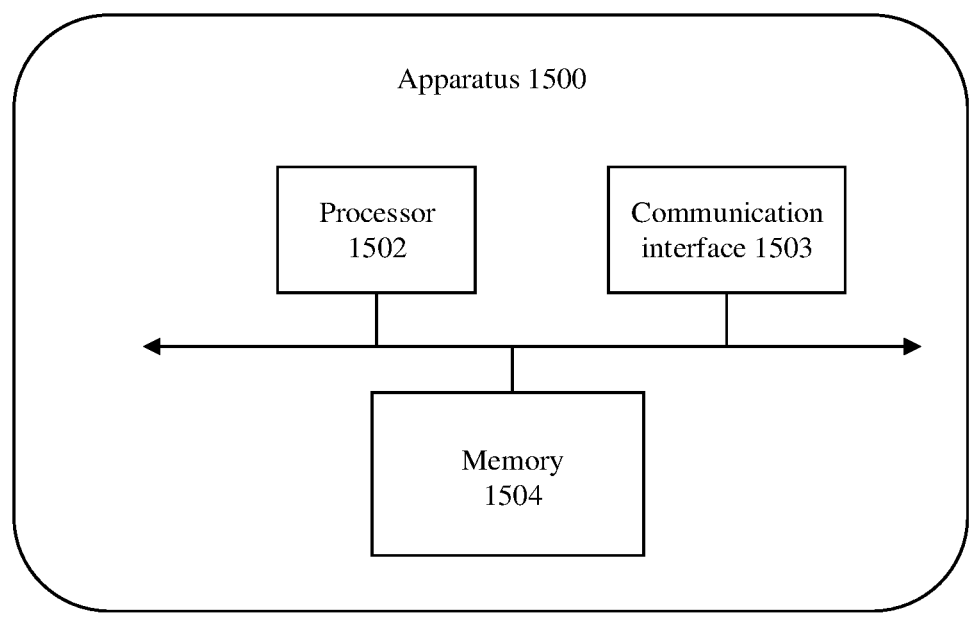
FIG. 15 is a diagram of another example of a structure of an apparatus for updating an object recognition model according to this application.

This application further provides an apparatus 1500 shown in FIG. 15. The apparatus 1500 includes a processor 1502, a communication interface 1503, and a memory 1504. An example of the apparatus 1500 is a chip. Another example of the apparatus 1500 is a computing device. Another example of the apparatus 1500 is a server.

The processor 1502, the memory 1504, and the communication interface 1503 may communicate with each other by using a bus. The memory 1504 stores executable code. The processor 1502 reads the executable code in the memory 1504 to perform a corresponding method. The memory 1504 may further include another software module, such as an operating system, required for running a process. The operating system may be Linux™, Unix™, Windows™, or the like.

For example, the executable code stored in the memory 1504 may be used for any one of the foregoing methods. The processor 1502 reads the executable code in the memory 1504 to perform any one of the foregoing methods.

The processor 1502 may be a central processing unit (CPU). The memory 1504 may include a volatile memory, for example, a random access memory (RAM). The memory 1504 may further include a non-volatile memory (NVM), for example, a read-only memory (ROM), a flash memory, a hard disk drive (HDD), or a solid-state disk (SSD).

A person of ordinary skill in the art may be aware that, with reference to the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

Units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory, a magnetic disk, or an optical disc.

The foregoing description is merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for updating an object recognition model, comprising:
   obtaining a target image captured by a photographing device;
   obtaining first voice information based on a voice instruction captured by a voice device, wherein the first voice information indicates a first category of a target object in the target image;
   generating a first label indicating the first category of the target object; and
   updating a first object recognition model to form a updated first object recognition model based on the target image and the first voice information, to add the first label into the first object recognition model, wherein the updated first object recognition model comprises a feature of the target object and the first label, and there is a correspondence between the feature of the target object and the first label,
   wherein the updating a first object recognition model based on the target image and the first voice information comprises:
   determining, based on a similarity between the first label and each of at least one category of label, that the first label is a first category of label in the at least one category of label, wherein a similarity between the first label and the first category of label is greater than a similarity between the first label and another category of label in the at least one category of label;
   determining, based on the target image by using second object recognition model, a probability that a category label of the target object is the first category of label; and
   when the probability is greater than or equal to a probability threshold, adding the feature of the target object and the first label to the first object recognition model.

2. The method according to claim 1, wherein the determining, based on a similarity between the first label and each of at least one category of label, that the first label is a first category of label in the at least one category of label comprises:
   determining, based on a similarity between a semantic feature of the first label and a semantic feature of each of the at least one category of label, that the first label is the first category of label in the at least one category of label; and
   that a similarity between the first label and the first category of label is greater than a similarity between the first label and another category of label in the at least one category of label comprises:
   a distance between the semantic feature of the first label and a semantic feature of the first category of label is less than a distance between the semantic feature of the first label and a semantic feature of the another category of label.

3. The method according to claim 1, wherein the target image comprises a first object, the target object is an object, in the target image, that is located in a direction indicated by the first object and that is closest to the first object among objects located in the direction indicated by the first object, and the first object comprises an eyeball or a finger.

4. The method according to claim 3, wherein the updating a first object recognition model based on the target image and the first voice information comprises:
   determining a bounding box of the first object in the target image;
   determining, based on an image in the bounding box, the direction indicated by the first object;
   performing visual saliency detection on the target image, to obtain a plurality of salient regions in the target image;
   determining a target salient region among the plurality of salient regions based on the direction indicated by the first object, wherein the target salient region is in the direction indicated by the first object and is closest to the bounding box of the first object among salient regions in the direction indicated by the first object; and
   updating the first object recognition model based on the target salient region, wherein an object in the target salient region comprises the target object.

5. The method according to claim 4, wherein the determining, based on an image in the bounding box, the direction indicated by the first object comprises:
   classifying the image in the bounding box by using a classification model, to obtain a target category of the first object; and
   determining, based on the target category of the first object, the direction indicated by the first object.

6. An apparatus for updating an object recognition model, comprising at least one processor coupled to a memory;
   the memory is configured to store instructions that, when executed by the at least one processor, enable the apparatus to perform operations comprising:
   obtaining a target image captured by a photographing device;
   obtaining first voice information based on a voice instruction captured by a voice device, wherein the first voice information indicates a first category of a target object in the target image;
   generating a first label indicating the first category of the target object; and
   updating a first object recognition model to form a updated first object recognition model based on the target image and the first voice information, to add the first label into the first object recognition model, wherein the updated first object recognition model comprises a feature of the target object and the first label, and there is a correspondence between the feature of the target object and the first label,
   wherein the updating a first object recognition model based on the target image and the first voice information comprises:
   determining, based on a similarity between the first label and each of at least one category of label, that the first label is a first category of label in the at least one category of label, wherein a similarity between the first label and the first category of label is greater than a similarity between the first label and another category of label in the at least one category of label;

determining, based on the target image by using a second object recognition model, a probability that a category label of the target object is the first category of label; and when the probability is greater than or equal to a probability threshold, adding the feature of the target object and the first label to the first object recognition model.

7. The apparatus according to claim 6, wherein the determining, based on a similarity between the first label and each of at least one category of label, that the first label is a first category of label in the at least one category of label comprises:

determining, based on a similarity between a semantic feature of the first label and a semantic feature of each of the at least one category of label, that the first label is the first category of label in the at least one category of label; and that a similarity between the first label and the first category of label is greater than a similarity between the first label and another category of label in the at least one category of label comprises:

a distance between the semantic feature of the first label and a semantic feature of the first category of label is less than a distance between the semantic feature of the first label and a semantic feature of the another category of label.

8. The apparatus according to claim 6, wherein the target image comprises a first object, the target object is an object, in the target image, that is located in a direction indicated by the first object and that is closest to the first object among objects located in the direction indicated by the first object, and the first object comprises an eyeball or a finger.

9. The apparatus according to claim 8, wherein the updating a first object recognition model based on the target image and the first voice information comprises:

determining a bounding box of the first object in the target image;

determining, based on an image in the bounding box, the direction indicated by the first object;

performing visual saliency detection on the target image, to obtain a plurality of salient regions in the target image;

determining a target salient region among the plurality of salient regions based on the direction indicated by the first object, wherein the target salient region is in the direction indicated by the first object and is closest to the bounding box of the first object among salient regions in the direction indicated by the first object; and updating the first object recognition model based on the target salient region, wherein an object in the target salient region comprises the target object.

10. The apparatus according to claim 9, wherein the determining, based on an image in the bounding box, the direction indicated by the first object comprises:

classifying the image in the bounding box by using a classification model, to obtain a target category of the first object; and determining, based on the target category of the first object, the direction indicated by the first object.

11. A non-transitory computer-readable medium storing information comprising instructions that, when executed by at least one processor, enable the at least one processor to perform operations comprising:

obtaining a target image captured by a photographing device;

obtaining first voice information based on a voice instruction captured by a voice device, wherein the first voice information indicates a first category of a target object in the target image;

generating a first label indicating the first category of the target object; and updating a first object recognition model to form a updated first object recognition model based on the target image and the first voice information, to add the first label into the first object recognition model, wherein the updated first object recognition model comprises a feature of the target object and the first label, and there is a correspondence between the feature of the target object and the first label, wherein the updating a first object recognition model based on the target image and the first voice information comprises:

determining, based on a similarity between the first label and each of at least one category of label, that the first label is a first category of label in the at least one category of label, wherein a similarity between the first label and the first category of label is greater than a similarity between the first label and another category of label in the at least one category of label;

determining, based on the target image by using a second object recognition model, a probability that a category label of the target object is the first category of label; and when the probability is greater than or equal to a probability threshold, adding the feature of the target object and the first label to the first object recognition model.

12. The non-transitory computer-readable medium according to claim 11, wherein the determining, based on a similarity between the first label and each of at least one category of label, that the first label is a first category of label in the at least one category of label comprises:

determining, based on a similarity between a semantic feature of the first label and a semantic feature of each of the at least one category of label, that the first label is the first category of label in the at least one category of label; and that a similarity between the first label and the first category of label is greater than a similarity between the first label and another category of label in the at least one category of label comprises:

a distance between the semantic feature of the first label and a semantic feature of the first category of label is less than a distance between the semantic feature of the first label and a semantic feature of the another category of label.

13. The non-transitory computer-readable medium according to claim 11, wherein the target image comprises a first object, the target object is an object, in the target image, that is located in a direction indicated by the first object and that is closest to the first object among objects located in the direction indicated by the first object, and the first object comprises an eyeball or a finger.

14. The non-transitory computer-readable medium according to claim 13, wherein the updating a first object recognition model based on the target image and the first voice information comprises:

determining a bounding box of the first object in the target image;

determining, based on an image in the bounding box, the direction indicated by the first object;

performing visual saliency detection on the target image, to obtain a plurality of salient regions in the target image;

determining a target salient region among the plurality of salient regions based on the direction indicated by the first object, wherein the target salient region is in the direction indicated by the first object and is closest to the bounding box of the first object among salient regions in the direction indicated by the first object; and updating the first object recognition model based on the target salient region, wherein an object in the target salient region comprises the target object.

15. The non-transitory computer-readable medium according to claim 14, wherein the determining, based on an image in the bounding box, the direction indicated by the first object comprises:

classifying the image in the bounding box by using a classification model, to obtain a target category of the first object; and determining, based on the target category of the first object, the direction indicated by the first object.

16. The method according to claim 1, wherein the first voice information is obtained, using a natural language understanding method, based on the voice instruction.

\* \* \* \* \*